(12) United States Patent
Bender et al.

(10) Patent No.: US 6,716,956 B2
(45) Date of Patent: Apr. 6, 2004

(54) PROCESS FOR PREPARING POLYARYLENE ETHERS

(75) Inventors: Timothy P. Bender, Port Credit (CA); Christine J. DeVisser, Langley (CA); Richard A. Burt, Oakville (CA); Paul F. Smith, Oakville (CA); Marko D. Saban, Etobicoke (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/040,850

(22) Filed: Jan. 9, 2002

(65) Prior Publication Data

US 2003/0176621 A1 Sep. 18, 2003

(51) Int. Cl.⁷ ................................................ C08G 14/00
(52) U.S. Cl. .................. 528/125; 528/126; 528/220; 528/488; 528/492; 528/501; 528/503; 525/310; 525/471; 525/534
(58) Field of Search ............................... 528/125, 126, 528/220, 488, 492, 501, 503; 525/390, 471, 534

(56) References Cited

U.S. PATENT DOCUMENTS

| | | | |
|---|---|---|---|
| 5,739,254 A | 4/1998 | Fuller et al. | 528/125 |
| 5,753,783 A | 5/1998 | Fuller et al. | 525/471 |
| 5,761,809 A | 6/1998 | Fuller et al. | 29/890.1 |
| 5,773,553 A | 6/1998 | Fuller et al. | 528/170 |
| 5,814,426 A | 9/1998 | Fuller et al. | 430/96 |
| 5,849,809 A | 12/1998 | Narang et al. | 522/35 |
| 5,863,963 A | 1/1999 | Narang et al. | 522/162 |
| 5,869,595 A | 2/1999 | Fuller et al. | 528/332 |
| 5,874,192 A | 2/1999 | Fuller et al. | 430/58 |
| 5,882,814 A | 3/1999 | Fuller et al. | 430/59 |
| 5,889,077 A | 3/1999 | Fuller et al. | 522/162 |
| 5,939,206 A | 8/1999 | Kneezel et al. | 428/480 |
| 5,945,253 A | 8/1999 | Narang et al. | 430/280.1 |
| 5,958,995 A | 9/1999 | Narang et al. | 522/35 |
| 5,994,425 A | 11/1999 | Narang et al. | 522/35 |
| 6,007,877 A | 12/1999 | Narang et al. | 427/510 |
| 6,020,119 A | 2/2000 | Foucher et al. | 430/627 |
| 6,022,095 A | 2/2000 | Narang et al. | 347/20 |
| 6,087,414 A | 7/2000 | Fuller et al. | 522/162 |
| 6,090,453 A | 7/2000 | Narang et al. | 427/504 |
| 6,117,967 A | 9/2000 | Fuller et al. | 528/125 |
| 6,124,372 A | 9/2000 | Smith et al. | 522/35 |
| 6,139,920 A | 10/2000 | Smith et al. | 427/510 |
| 6,151,042 A | 11/2000 | Smith et al. | 347/20 |
| 6,174,636 B1 | 1/2001 | Fuller et al. | 430/58.7 |
| 6,177,238 B1 | 1/2001 | Fuller et al. | 430/320 |
| 6,184,263 B1 | 2/2001 | Narang et al. | 522/111 |
| 6,187,512 B1 | 2/2001 | Foucher et al. | 430/311 |
| 6,203,143 B1 | 3/2001 | Narang et al. | 347/65 |
| 6,260,949 B1 | 7/2001 | Smith et al. | 347/44 |
| 6,260,956 B1 | 7/2001 | Narang et al. | 347/63 |
| 6,273,543 B1 | 8/2001 | Narang et al. | 347/20 |
| 6,273,985 B1 | 8/2001 | DeLouise et al. | 156/273.3 |
| 6,323,301 B1 | 11/2001 | Smith et al. | 528/125 |

FOREIGN PATENT DOCUMENTS

| | | |
|---|---|---|
| EP | 0 918 256 A2 | 5/1989 |
| EP | 0 826 700 A2 | 3/1998 |
| EP | 0 827 026 A2 | 3/1998 |
| EP | 0827 027 A2 | 3/1998 |
| EP | 827 028 A2 | 3/1998 |
| EP | 0827 029 A2 | 3/1998 |
| EP | 0 827 030 A2 | 3/1998 |
| EP | 0 827 031 A2 | 3/1998 |
| EP | 0 827 032 A2 | 3/1998 |
| EP | 0 827 033 A2 | 3/1998 |
| EP | 0 827 026 A3 | 6/1998 |
| EP | 0 827 027 A3 | 6/1998 |
| EP | 0827 029 A3 | 6/1998 |
| EP | 0 827 030 A3 | 6/1998 |
| EP | 0 827 031 A3 | 6/1998 |
| EP | 0 827 032 A3 | 6/1998 |
| EP | 0 827 033 A3 | 6/1998 |
| EP | 0 918 257 A2 | 5/1999 |
| EP | 0 918 258 A2 | 5/1999 |
| EP | 0 918 256 A3 | 11/1999 |
| EP | 0 918 258 A3 | 3/2000 |
| EP | 0 826 700 A3 | 4/2000 |
| EP | 0 918 257 A3 | 1/2001 |
| JP | 10087817 | 4/1998 |
| JP | 10090894 | 4/1998 |
| JP | 10090895 | 4/1998 |
| JP | 10090896 | 4/1998 |
| JP | 10090897 | 4/1998 |
| JP | 10090898 | 4/1998 |
| JP | 10090899 | 4/1998 |
| JP | 10097073 | 4/1998 |
| JP | 10100410 | 4/1998 |
| JP | 10104836 | 4/1998 |
| JP | 10120743 | 5/1998 |
| JP | 1123955 | 8/1999 |
| JP | 11218943 | 8/1999 |
| JP | 11223956 | 8/1999 |
| JP | 2000344884 | 12/2000 |

OTHER PUBLICATIONS

Bender et al, The synthesis of Poly(arylene ether)s in solution at Pilot Plant Scale with control over Molecular weight and End–group composition, Sep. 2002, Chem Abstract 137: 233008.*

Copending application Ser. No. 09/268,794 entitled "High Performance Curable Polymers And Processes For The Preparation Thereof," filed on Mar. 16, 1999 by Narang et al.

Copending application Ser. No. 09/844,371 entitled "Bonding Process," filed on Apr. 27, 2001 by Delouise et al.

* cited by examiner

*Primary Examiner*—Duc Truong
(74) *Attorney, Agent, or Firm*—Judith L. Byorick

(57) ABSTRACT

Disclosed is a process for preparing a polymer of the formula

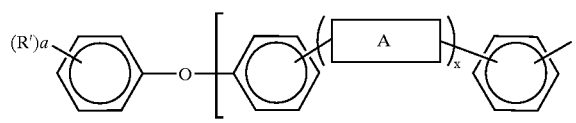

-continued

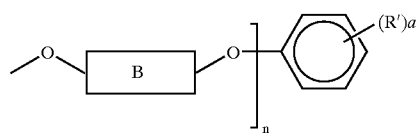

or

-continued

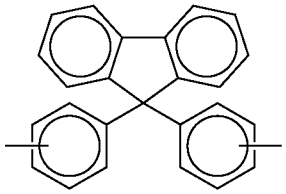

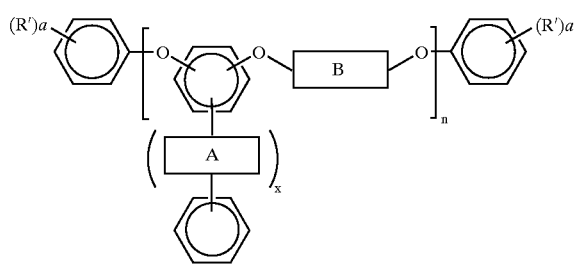

wherein x is an integer of 0 or 1, A is one of several specific groups, such as

B is one of several specified groups, such as

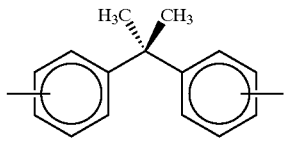

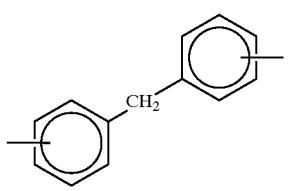

or mixtures thereof, and n is an integer representing the number of repeating monomer units, said process comprising (A) providing a reaction mixture which comprises (i) a solvent, (ii) a compound of the formula

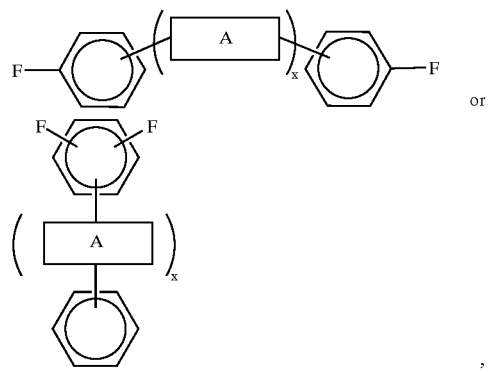

or

, (iii) a compound of the formula

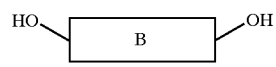

(iv) a compound of the formula

wherein a is an integer of from 1 to 5, R' is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, or a mixture thereof, and (v) a carbonate base; and (B) heating the reaction mixture and removing generated water from the reaction mixture, thereby effecting a polymerization reaction.

22 Claims, No Drawings

PROCESS FOR PREPARING POLYARYLENE ETHERS

BACKGROUND OF THE INVENTION

The present invention is directed to improved processes for making polyarylene ether compounds. More specifically, the present invention is directed to a process for preparing polyarylene ether compounds wherein the molecular weight of the product is well controlled. One embodiment of the present invention is directed to a process for preparing a polymer of the formula

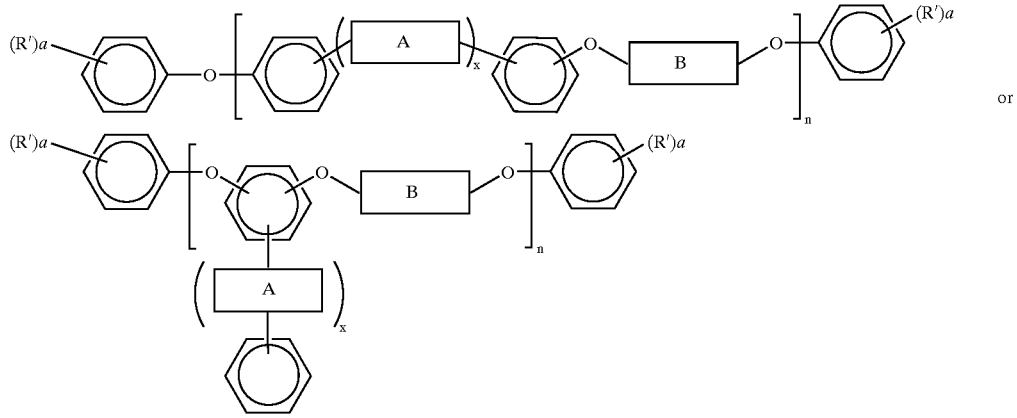

wherein x is an integer of 0 or 1, a is an integer of from 1 to 5, R' is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, or a mixture thereof, A is

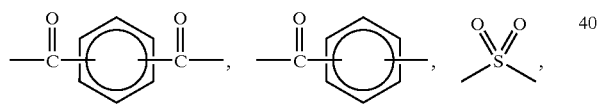

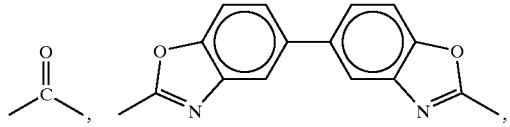

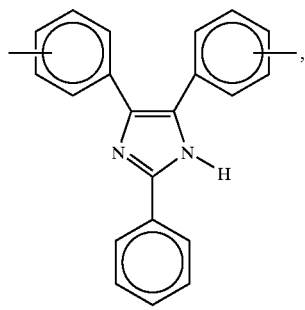

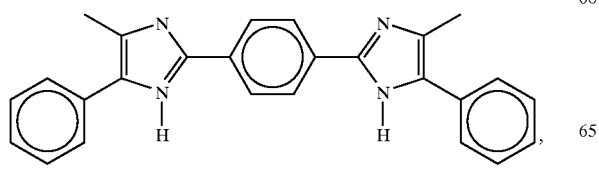

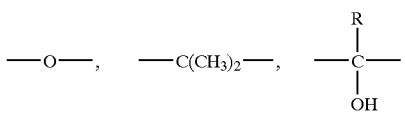

wherein R is a hydrogen atom, an alkyl group, an aryl group, or mixtures thereof,

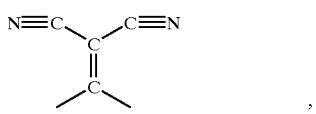

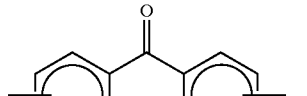

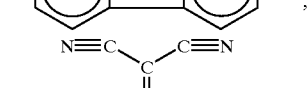

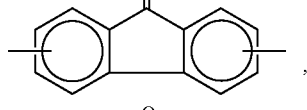

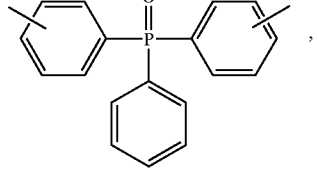

or mixtures thereof, B is

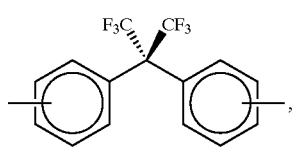

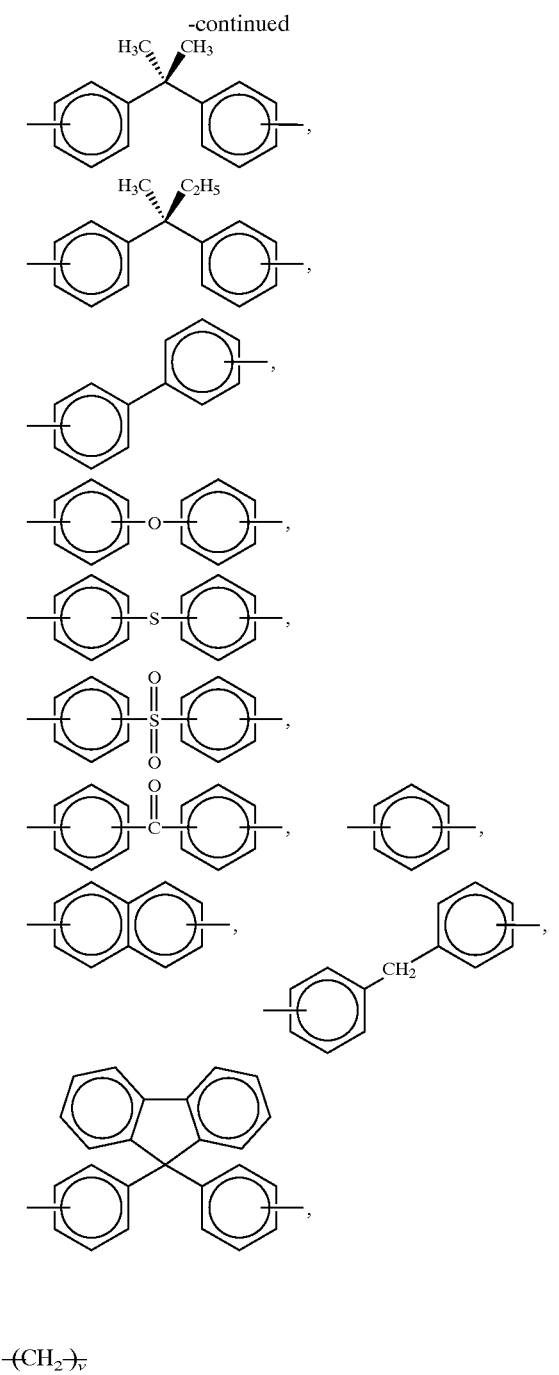
-(CH$_2$)$_v$-
wherein v is an integer of from 1 to about 20,
—(CH$_2$O)$_t$—
wherein t is an integer of from 1 to about 20,
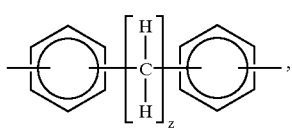
wherein z is an integer of from 2 to about 20,
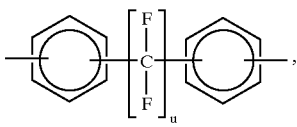
wherein u is an integer of from 1 to about 20,
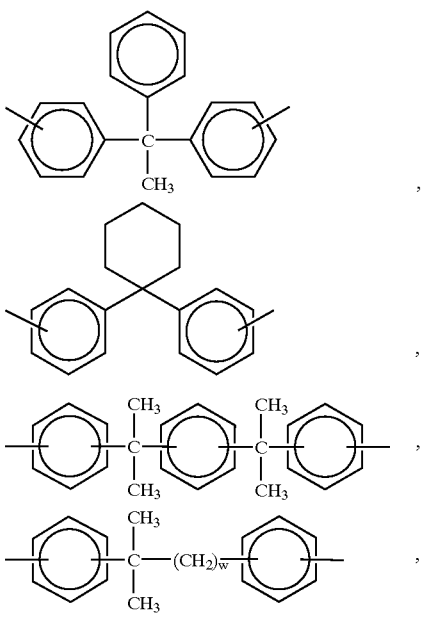
wherein w is an integer of from 1 to about 20,
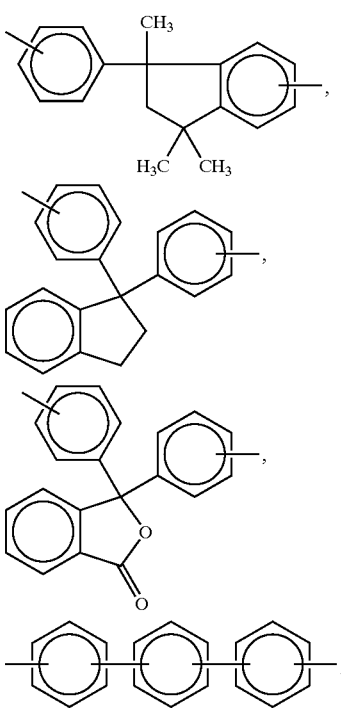

-continued

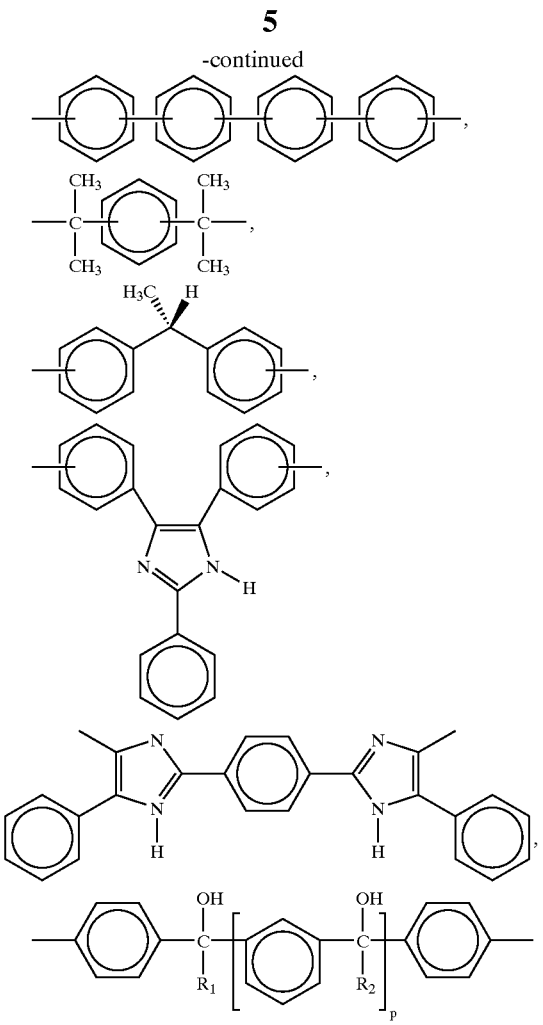

wherein $R_1$ and $R_2$ each, independently of the other, are hydrogen atoms, alkyl groups, aryl groups, or mixtures thereof, and p is an integer of 0 or 1,

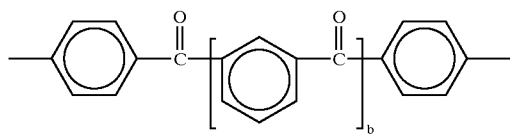

wherein b is an integer of 0 or 1,

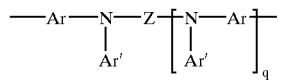

wherein (1) Z is

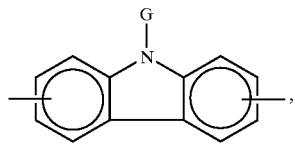

-continued

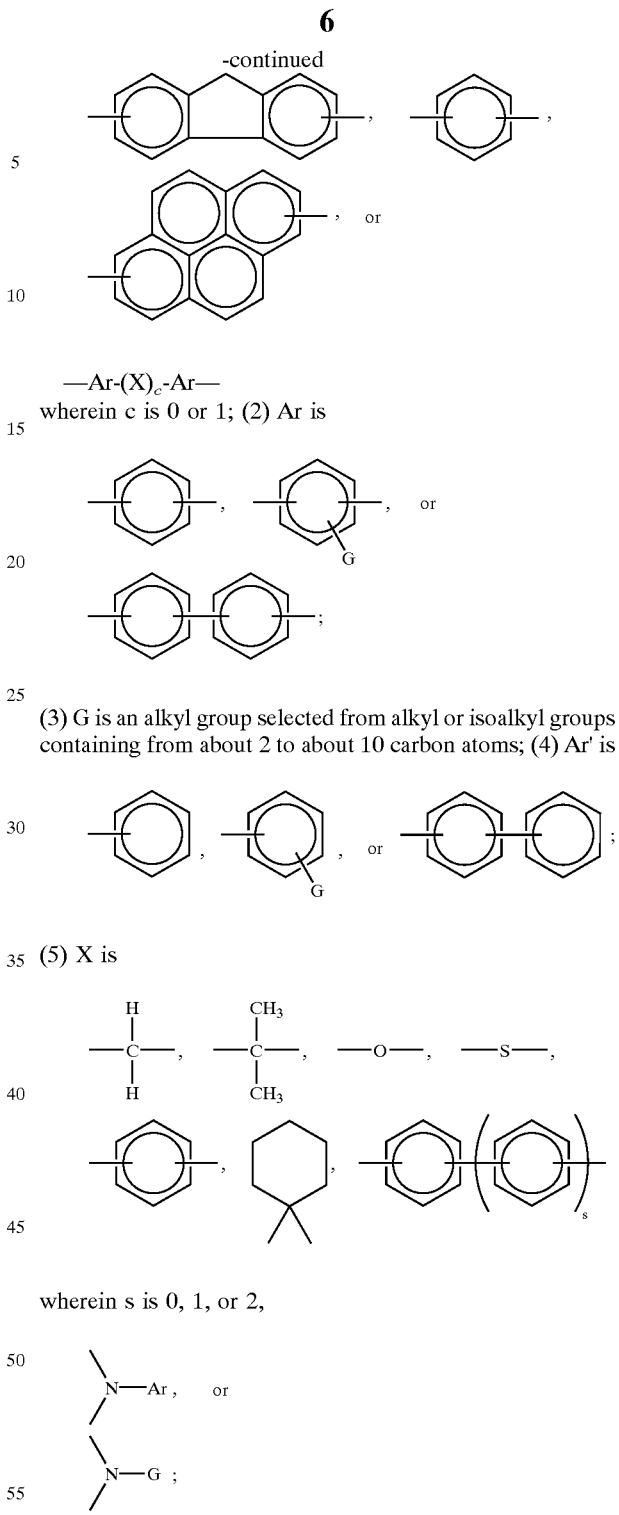

—Ar-(X)$_c$-Ar— wherein c is 0 or 1; (2) Ar is (3) G is an alkyl group selected from alkyl or isoalkyl groups containing from about 2 to about 10 carbon atoms; (4) Ar' is (5) X is wherein s is 0, 1, or 2, and (6) q is 0 or 1; or mixtures thereof, and n is an integer representing the number of repeating monomer units, said process comprising (A) providing a reaction mixture which comprises (i) a solvent, (ii) a compound of the formula

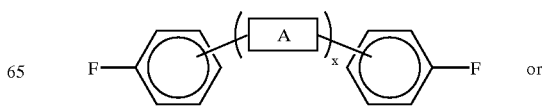

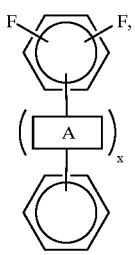

(iii) a compound of the formula

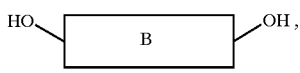

(iv) a compound of the formula

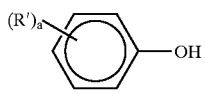

wherein a is an integer of from 1 to 5 and R' is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, or a mixture thereof, and (v) a carbonate base; and (B) heating the reaction mixture and removing generated water from the reaction mixture, thereby effecting a polymerization reaction.

Polyarylene ethers are known polymers for use as high performance engineering thermoplastics. They exhibit outstanding physical properties and high chemical resistance. The use of these materials as photoresists when substituted with photoactive substituents is also known.

While polyarylene ethers are well known compounds, only a few examples of these materials are commercially available. Commercially available materials tend to be polymers of high molecular weight. Some applications for polyarylene ethers, however, such as ultra-thin films, photoresists, and the like, can be better carried out with polymers of lower molecular weight and/or lower solution viscosity.

U.S. Pat. No. 5,994,425 (Narang et al.), U.S. Pat. No. 6,022,095 (Narang et al.), EP 827027, and JP 10120743, the disclosures of each of which are totally incorporated herein by reference, disclose an improved composition comprising a photopatternable polymer containing at least some monomer repeat units with photosensitivity-imparting substituents, said photopatternable polymer being of the general formula

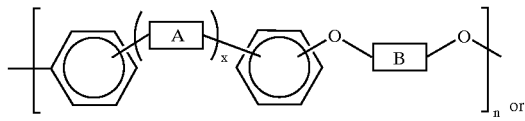

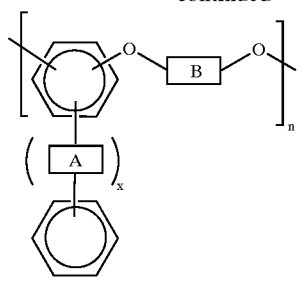

wherein x is an integer of 0 or 1, A is one of several specified groups, such as

B is one of several specified groups, such as

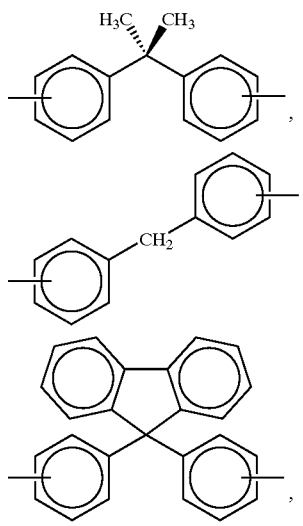

or mixtures thereof, and n is an integer representing the number of repeating monomer units. Also disclosed is a process for preparing a thermal ink jet printhead with the aforementioned polymer and a thermal ink jet printhead containing therein a layer of a crosslinked or chain extended polymer of the above formula.

U.S. Pat. No. 5,849,809 (Narang et al.), U.S. Pat. No. 6,203,143 (Narang et al.), EP 827028, and JP 10090895, the disclosures of each of which are totally incorporated herein by reference, disclose a composition which comprises (a) a polymer containing at least some monomer repeat units with photosensitivity-imparting substituents which enable crosslinking or chain extension of the polymer upon exposure to actinic radiation, said polymer being of the formula

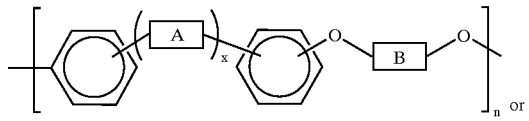

-continued

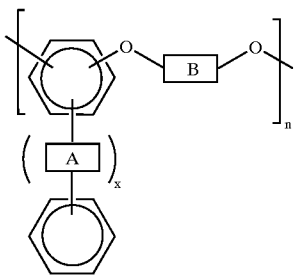

wherein x is an integer of 0 or 1, A is one of several specified groups, such as

B is one of several specified groups, such as

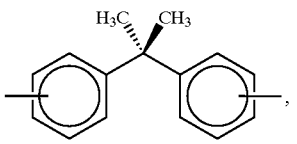,

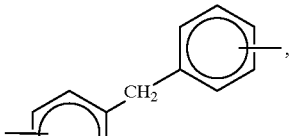,

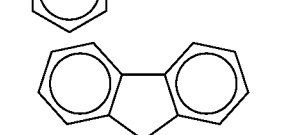, or mixtures thereof, and n is an integer representing the number of repeating monomer units, wherein said photosensitivity-imparting substituents are hydroxyalkyl groups; (b) at least one member selected from the group consisting of photoinitiators and sensitizers; and (c) an optional solvent. Also disclosed are processes for preparing the above polymers and methods of preparing thermal ink jet printheads containing the above polymers.

U.S. Pat. No. 6,124,372 (Smith et al.), U.S. Pat. No. 6,151,042 (Smith et al.), U.S. Pat. No. 6,323,301 (Smith et al.), EP 827029, and JP 10097073, the disclosures of each of which are totally incorporated herein by reference, disclose a composition comprising a polymer with a weight average molecular weight of from about 1,000 to about 100,000, said polymer containing at least some monomer repeat units with a first, photosensitivity-imparting substituent which enables crosslinking or chain extension of the polymer upon exposure to actinic radiation, said polymer also containing a second, thermal sensitivity-imparting substituent which enables further crosslinking or chain extension of the polymer upon exposure to temperatures of about 140° C. and higher, wherein the first substituent is not the same as the second substituent, said polymer being selected from the group consisting of polysulfones, polyphenylenes, polyether sulfones, polyimides, polyamide imides, polyarylene ethers, polyphenylene sulfides, polyarylene ether ketones, phenoxy resins, polycarbonates, polyether imides, polyquinoxalines, polyquinolines, polybenzimidazoles, polybenzoxazoles, polybenzothiazoles, polyoxadiazoles, copolymers thereof, and mixtures thereof.

U.S. Pat. No. 5,889,077 (Fuller et al.), U.S. Pat. No. 6,087,414 (Fuller et al.), EP 827030, and JP 10090894, the disclosures of each of which are totally incorporated herein by reference, disclose a process which comprises reacting a polymer of the general formula

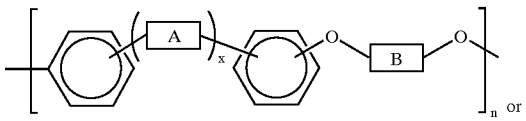 or

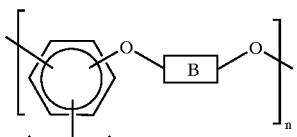

wherein x is an integer of 0 or 1, A is one of several specified groups, such as

B is one of several specified groups, such as

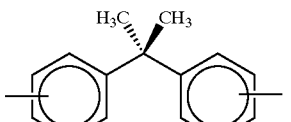,

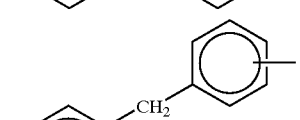,

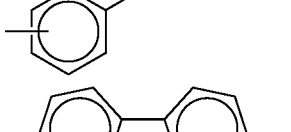, or mixtures thereof, and n is an integer representing the number of repeating monomer units, with (i) a formaldehyde source, and (ii) an unsaturated acid in the presence of an acid catalyst, thereby forming a curable polymer with unsaturated ester groups. Also disclosed is a process for preparing an ink jet printhead with the above polymer.

U.S. Pat. No. 5,739,254 (Fuller et al.), U.S. Pat. No. 5,753,783 (Fuller et al.), EP 826700, and JP 10087817, the disclosures of each of which are totally incorporated herein by reference, disclose a process which comprises reacting a polymer of the general formula

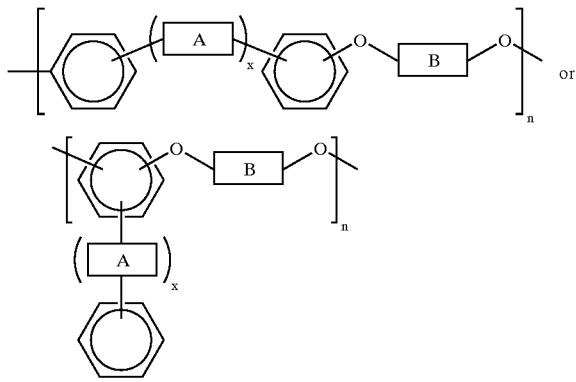

wherein x is an integer of 0 or 1, A is one of several specified groups, such as

B is one of several specified groups, such as

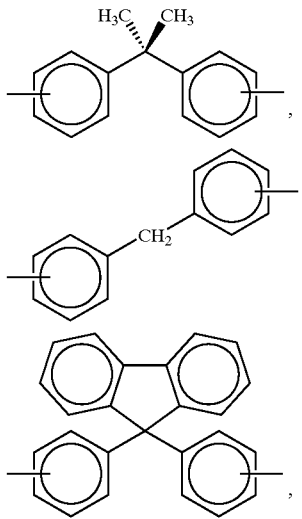

or mixtures thereof, and n is an integer representing the number of repeating monomer units, with an acetyl halide and dimethoxymethane in the presence of a halogen-containing Lewis acid catalyst and methanol, thereby forming a haloalkylated polymer. In a specific embodiment, the haloalkylated polymer is then reacted further to replace at least some of the haloalkyl groups with photosensitivity-imparting groups. Also disclosed is a process for preparing a thermal ink jet printhead with the aforementioned polymer.

U.S. Pat. No. 5,761,809 (Fuller et al.), EP 827026, and JP 10090896, the disclosures of each of which are totally incorporated herein by reference, disclose a process which comprises reacting a haloalkylated aromatic polymer with a material selected from the group consisting of unsaturated ester salts, alkoxide salts, alkylcarboxylate salts, and mixtures thereof, thereby forming a curable polymer having functional groups corresponding to the selected salt. Another embodiment of the present invention is directed to a process for preparing an ink jet printhead with the curable polymer thus prepared.

U.S. Pat. No. 5,958,995 (Narang et al.), U.S. Pat. No. 6,184,263 (Narang et al.), EP 827031, and JP 10104836, the disclosures of each of which are totally incorporated herein by reference, disclose a composition which comprises a mixture of (A) a first component comprising a polymer, at least some of the monomer repeat units of which have at least one photosensitivity-imparting group thereon, said polymer having a first degree of photosensitivity-imparting group substitution measured in milliequivalents of photosensitivity-imparting group per gram and being of the general formula

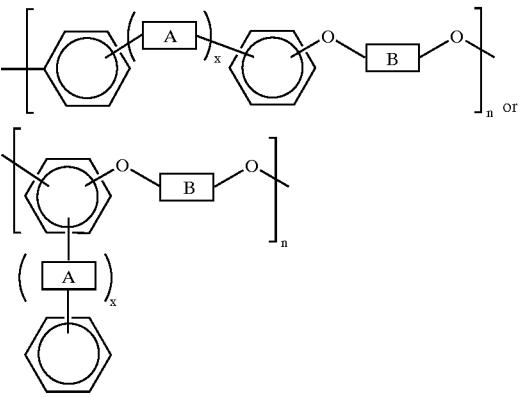

wherein x is an integer of 0 or 1, A is one of several specified groups, such as

B is one of several specified groups, such as

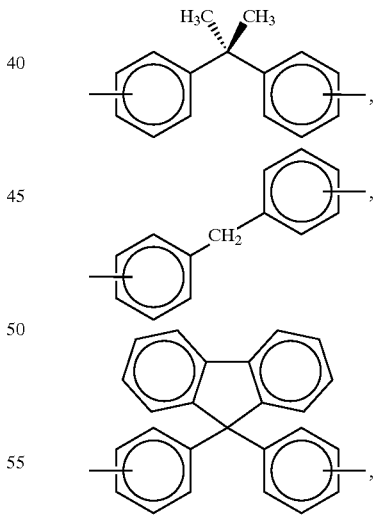

or mixtures thereof, and n is an integer representing the number of repeating monomer units, and (B) a second component which comprises either (1) a polymer having a second degree of photosensitivity-imparting group substitution measured in milliequivalents of photosensitivity-imparting group per gram lower than the first degree of photosensitivity-imparting group substitution, wherein said second degree of photosensitivity-imparting group substitution may be zero, wherein the mixture of the first component and the second component has a third degree of photosensitivity-imparting group substitution measured in milliequivalents of photosensitivity-imparting group per gram which is lower than the first degree of photosensitivity-imparting group substitution and higher than the second degree of photosensitivity-imparting group substitution, or (2) a reactive diluent having at least one photosensitivity-imparting group per molecule and having a fourth degree of photosensitivity-imparting group substitution measured in milliequivalents of photosensitivity-imparting group per gram, wherein the mixture of the first component and the second component has a fifth degree of photosensitivity-imparting group substitution measured in milliequivalents of photosensitivity-imparting group per gram which is higher than the first degree of photosensitivity-imparting group substitution and lower than the fourth degree of photosensitivity-imparting group substitution; wherein the weight average molecular weight of the mixture is from about 10,000 to about 50,000; and wherein the third or fifth degree of photosensitivity-imparting group substitution is from about 0.25 to about 2 milliequivalents of photosensitivity-imparting groups per gram of mixture. Also disclosed is a process for preparing a thermal ink jet printhead with the aforementioned composition.

U.S. Pat. No. 5,945,253 (Narang et al.), Copending application U.S. Ser. No. 09/268,794, EP 827033, and JP 10090897, the disclosures of each of which are totally incorporated herein by reference, disclose a composition which comprises a polymer containing at least some monomer repeat units with photosensitivity-imparting substituents which enable crosslinking or chain extension of the polymer upon exposure to actinic radiation, said polymer being of the formula

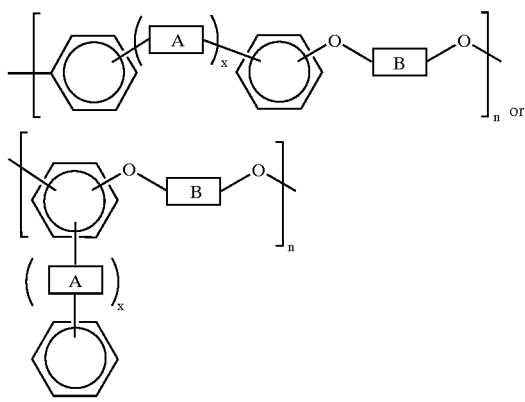

wherein x is an integer of 0 or 1, A is one of several specified groups, such as

B is one of several specified groups, such as

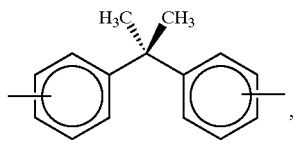

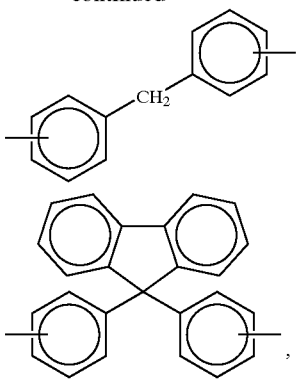

or mixtures thereof, and n is an integer representing the number of repeating monomer units, wherein said photosensitivity-imparting substituents are allyl ether groups, epoxy groups, or mixtures thereof. Also disclosed are a process for preparing a thermal ink jet printhead containing the aforementioned polymers and processes for preparing the aforementioned polymers.

U.S. Pat. No. 5,863,963 (Narang et al.), U.S. Pat. No. 6,090,453 (Narang et al.), and JP 10090899, the disclosures of each of which are totally incorporated herein by reference, disclose a process which comprises the steps of (a) providing a polymer containing at least some monomer repeat units with halomethyl group substituents which enable crosslinking or chain extension of the polymer upon exposure to a radiation source which is electron beam radiation, x-ray radiation, or deep ultraviolet radiation, said polymer being of the formula

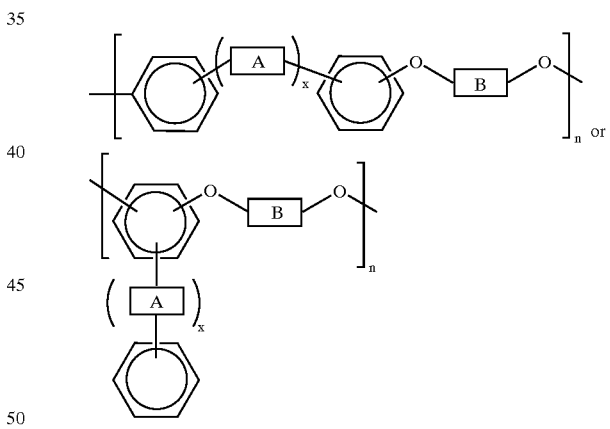

wherein x is an integer of 0 or 1, A is one of several specified groups, such as

B is one of several specified groups, such as

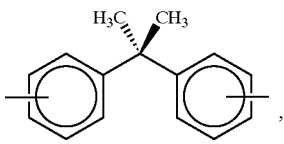

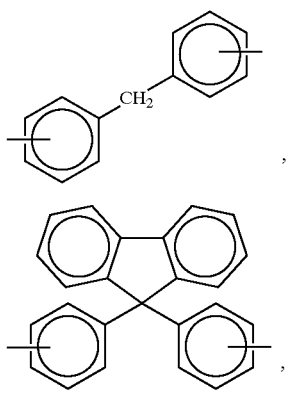

or mixtures thereof, and n is an integer representing the number of repeating monomer units, and (b) causing the polymer to become crosslinked or chain extended through the photosensitivity-imparting groups. Also disclosed is a process for preparing a thermal ink jet printhead by the aforementioned curing process.

U.S. Pat. No. 6,007,877 (Narang et al.), U.S. Pat. No. 6,273,543 (Narang et al.), EP 827032, and JP 10090898, the disclosures of each of which are totally incorporated herein by reference, disclose a composition which comprises a polymer containing at least some monomer repeat units with water-solubility- or water-dispersability-imparting substituents and at least some monomer repeat units with photosensitivity-imparting substituents which enable crosslinking or chain extension of the polymer upon exposure to actinic radiation, said polymer being of the formula

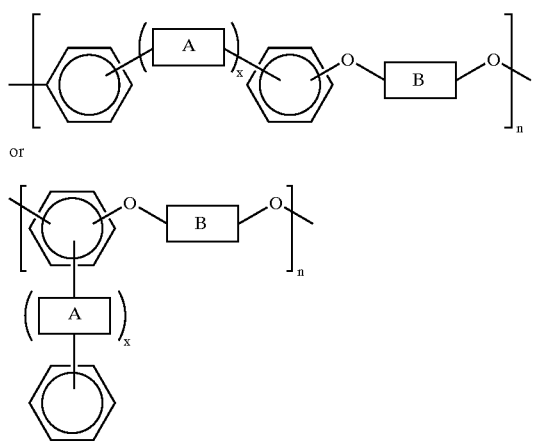

wherein x is an integer of 0 or 1, A is one of several specified groups, such as

B is one of several specified groups, such as

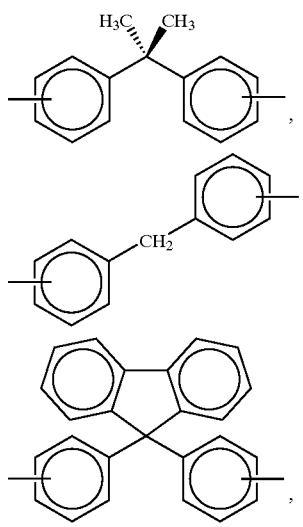

or mixtures thereof, and n is an integer representing the number of repeating monomer units. In one embodiment, a single functional group imparts both photosensitivity and water solubility or dispersability to the polymer. In another embodiment, a first functional group imparts photosensitivity to the polymer and a second functional group imparts water solubility or dispersability to the polymer. Also disclosed is a process for preparing a thermal ink jet printhead with the aforementioned polymers.

U.S. Pat. No. 5,814,426 (Fuller et al.), EP 918257, and JP 11218943, the disclosures of each of which are totally incorporated herein by reference, disclose an imaging member which comprises a conductive substrate, a photogenerating material, and a binder which comprises a polymer of the formulae I, II, III, IV, V, VI, VII VIII IX or X as further defined therein.

U.S. Pat. No. 5,882,814 (Fuller et al.), EP 918256, and JP 11223956, the disclosures of each of which are totally incorporated herein by reference, disclose an imaging member which comprises a conductive substrate, a photogenerating layer, and a charge transport layer comprising a polymer of the formulae I, II, III, IV, V, VI, VII, VIII, IX, or X as further defined therein.

U.S. Pat. No. 5,874,192 (Fuller et al.), EP 918258, and JP 11223955, the disclosures of each of which are totally incorporated herein by reference, disclose an imaging member which comprises a conductive substrate, a photogenerating material, a charge transport material, and a polymeric binder comprising (a) a first polymer comprising a polycarbonate, and (b) a second polymer of the formulae I, II, III, IV, V, VI, VII, VIII, IX, or X as further defined therein.

U.S. Pat. No. 6,273,985 (DeLouise et al.) and Copending application U.S. Ser. No. 09/844,371, the disclosures of each of which are totally incorporated herein by reference, disclose a process for bonding a first article to a second article which comprises (a) providing a first article comprising a polymer having photosensitivity-imparting substituents; (b) providing a second article comprising metal, plasma nitride, silicon, or glass; (c) applying to at least one of the first article and the second article an adhesion promoter selected from silanes, titanates, or zirconates having (i) alkoxy, aryloxy, or arylalkyloxy functional groups and (ii) functional groups including at least one photosensitive aliphatic >C═C<linkage; (d) placing the first article in contact with the second article; and (e) exposing the first article, second article, and adhesion promoter to radiation, thereby bonding the first article to the second article with the adhesion promote. In one embodiment of the present invention, the adhesion promoter is employed in microelectrical mechanical systems such as thermal ink jet printheads.

U.S. Pat. No. 6,260,956 (Narang et al.), the disclosure of which is totally incorporated herein by reference, discloses an ink jet printhead which comprises (i) an upper substrate with a set of parallel grooves for subsequent use as ink channels and a recess for subsequent use as a manifold, the grooves being open at one end for serving as droplet emitting nozzles, and (ii) a lower substrate in which one surface thereof has an array of heating elements and addressing electrodes formed thereon, said lower substrate having an insulative layer deposited on the surface thereof and over the heating elements and addressing electrodes and patterned to form recesses therethrough to expose the heating elements and terminal ends of the addressing electrodes, the upper and lower substrates being aligned, mated, and bonded together to form the printhead with the grooves in the upper substrate being aligned with the heating elements in the lower substrate to form droplet emitting nozzles, said upper substrate comprising a material formed by crosslinking or chain extending a polymer of formula I or II.

U.S. Pat. No. 6,117,967 (Fuller et al.), the disclosure of which is totally incorporated herein by reference, discloses a polymer of the formula

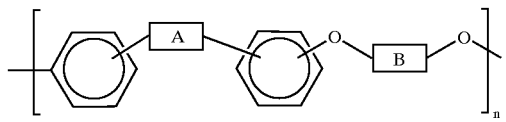

wherein A is

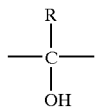

or a mixture of

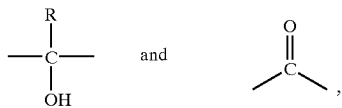

wherein R is a hydrogen atom, an alkyl group, an aryl group, or mixtures thereof, B is one of specified groups, such as

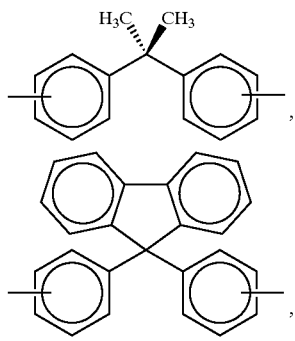

or mixtures thereof, and n is an integer representing the number of repeating monomer units.

U.S. Pat. No. 6,177,238 (Fuller et al.), the disclosure of which is totally incorporated herein by reference, discloses an ink jet printhead containing a polymer of the formula

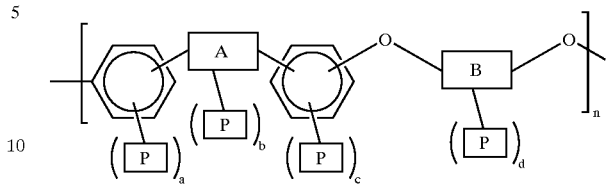

wherein P is a substituent which enables crosslinking of the polymer, a, b, c, and d are each integers of 0, 1, 2, 3, or 4, provided that at least one of a, b, c, and d is equal to or greater than 1 in at least some of the monomer repeat units of the polymer, A is

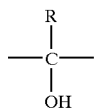

or a mixture of

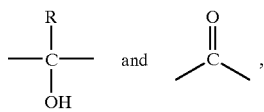

wherein R is a hydrogen atom, an alkyl group, an aryl group, or mixtures thereof, B is one of specified groups, such as

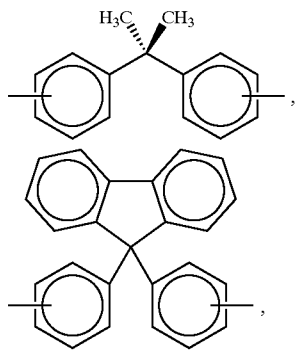

or mixtures thereof, and n is an integer representing the number of repeating monomer units.

U.S. Pat. No. 6,174,636 (Fuller et al.), the disclosure of which is totally incorporated herein by reference, discloses an imaging member which comprises a conductive substrate, a photogenerating material, and a binder comprising a polymer of the formula

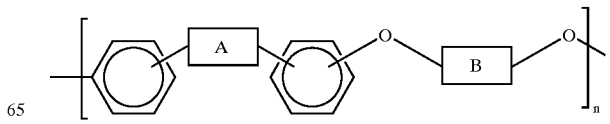

where in A is

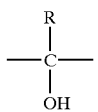

or a mixture of

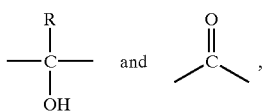

wherein R is a hydrogen atom, an alkyl group, an aryl group, or mixtures thereof, B is one of specified groups, such as

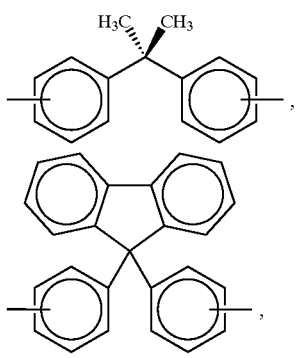

or mixtures thereof, and n is an integer representing the number of repeating monomer units.

U.S. Pat. No. 6,187,512 (Foucher et al.) and JP 2000344884, the disclosures of each of which are totally incorporated herein by reference, disclose a process which comprises reacting a polymer of the general formula

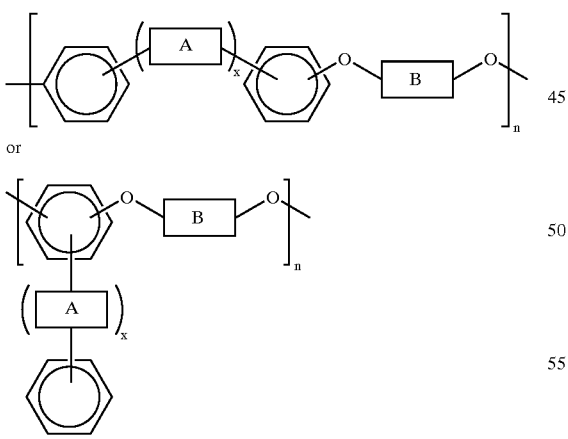

wherein x is an integer of 0 or 1, A is one of several specified groups, such as

B is one of several specified groups, such as

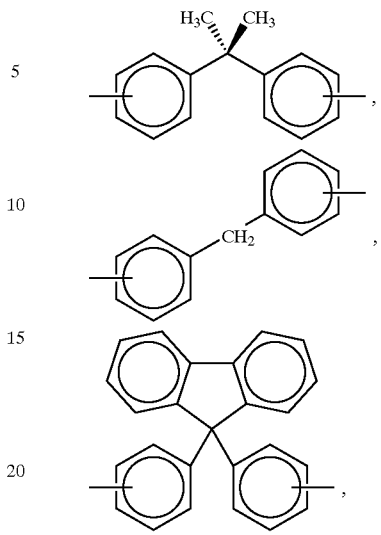

or mixtures thereof, and n is an integer representing the number of repeating monomer units, with a halomethyl alkyl ether, an acetyl halide, and methanol in the presence of a halogen-containing Lewis acid catalyst, thereby forming a halomethylated polymer.

U.S. Pat. No. 6,020,119 (Foucher et al.), the disclosure of which is totally incorporated herein by reference, discloses a process which comprises reacting a polymer of the general formula

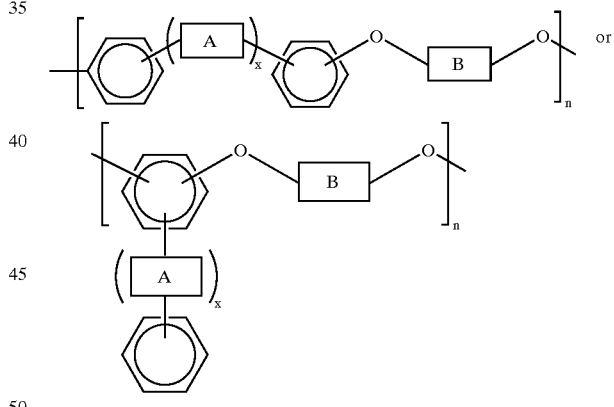

wherein x is an integer of 0 or 1, A is one of several specified groups, such as

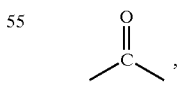

B is one of several specified groups, such as

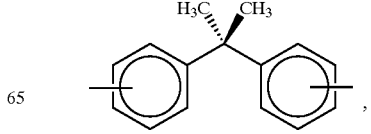

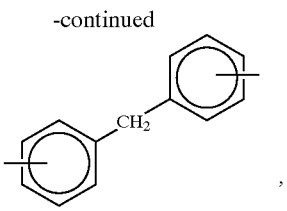

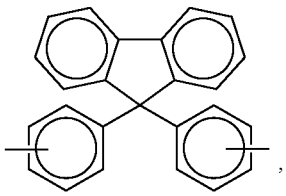

or mixtures thereof, and n is an integer representing the number of repeating monomer units, with a halomethylethyl ether, a hydrohalic acid, and acetic acid in the presence of a halogen-containing Lewis acid catalyst, thereby forming a halomethylated polymer.

U.S. Pat. No. 6,139,920 (Smith et al.) and U.S. Pat. No. 6,260,949 (Smith et al.), the disclosures of each of which are totally incorporated herein by reference, disclose a composition comprising a blend of (a) a thermally reactive polymer selected from the group consisting of resoles, novolacs, thermally reactive polyarylene ethers, and mixtures thereof, and (b) a photoreactive epoxy resin that is photoreactive in the absence of a photocationic initiator.

U.S. Pat. No. 5,773,553 (Fuller et al.) and U.S. Pat. No. 5,869,595 (Fuller et al.), the disclosures of each of which are totally incorporated herein by reference, disclose a process which comprises reacting a polyimide precursor with borane. Also disclosed is a thermal ink jet printhead containing a layer comprising the product of this reaction.

U.S. Pat. No. 5,939,206 (Kneezel et al.) and JP 10100410, the disclosures of each of which are totally incorporated herein by reference, disclose an apparatus which comprises at least one semiconductor chip mounted on a substrate, said substrate comprising a porous, electrically conductive member having electrophoretically deposited thereon a coating of a polymeric material. In one embodiment, the semiconductor chips are thermal ink jet printhead subunits.

While known compositions and processes are suitable for their intended purposes, a need remains for improved polyarylene ether compositions. In addition, a need remains for polyarylene ether compositions of relatively low molecular weight. Further, a need remains for polyarylene ether compositions of relatively narrow polydispersity. Additionally, a need remains for polyarylene ether compositions having few or no halide end groups that might adversely affect the properties of the polymer. There is also a need for methods for preparing polyarylene ethers with relatively low molecular weight. In addition, there is a need for methods for preparing polyarylene ethers with relatively narrow polydispersity. Further, there is a need for methods for preparing polyarylene ethers that can be accomplished in relatively short periods of time. Additionally, there is a need for methods for preparing polyarylene ethers that enable accurate control of the molecular weight of the product. A need also remains for methods for preparing polyarylene ethers that enable accurate control of the end groups of the polymer product. In addition, a need remains for methods for preparing polyarylene ethers that enable preparation of products having few or no halide end groups that might adversely affect the properties of the polymer. Further, a need remains for methods for preparing polyarylene ethers that can be completed within one eight-hour working shift. Additionally, a need remains for methods for preparing polyarylene ethers with simplified operator requirements. There is also a need for methods for preparing polyarylene ethers with simplified hardware requirements. In addition, there is a need for methods for preparing polyarylene ethers to a predetermined molecular weight without the need for extensive operator supervision of the reaction. Further, there is a need for polyarylene ethers that, when incorporated into photoresist solutions, enable reduced solution viscosity. Additionally, there is a need for polyarylene ethers that, when used in photoresist applications, enable the generation of images or features with desirably sharp edges.

SUMMARY OF THE INVENTION

The present invention is directed to a process for preparing a polymer of the formula

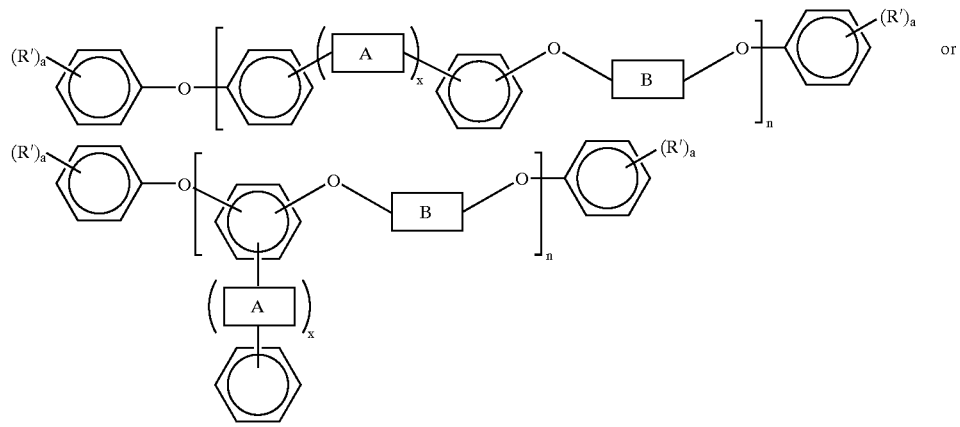

wherein x is an integer of 0 or 1, a is an integer of from 1 to 5, R' is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, or a mixture thereof, A is

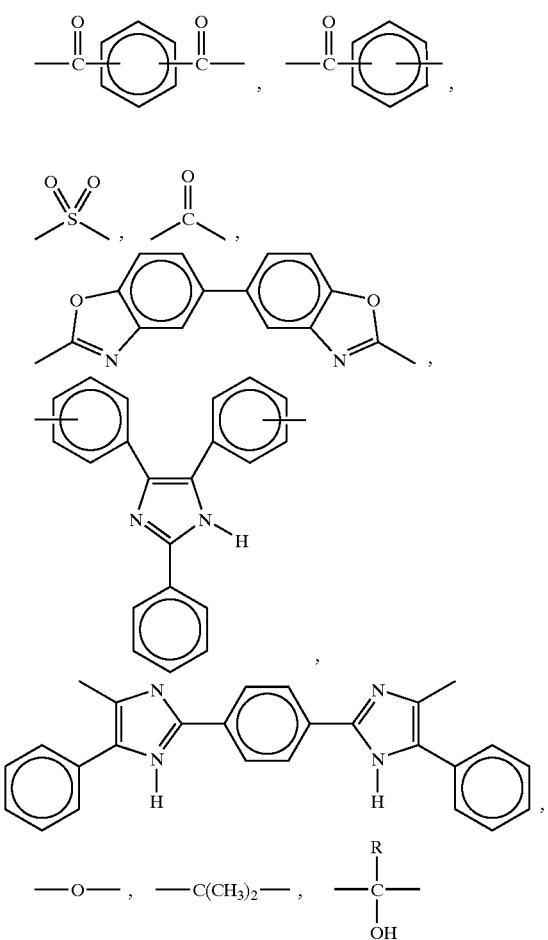
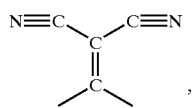
wherein R is a hydrogen atom, an alkyl group, an aryl group, or mixtures thereof,
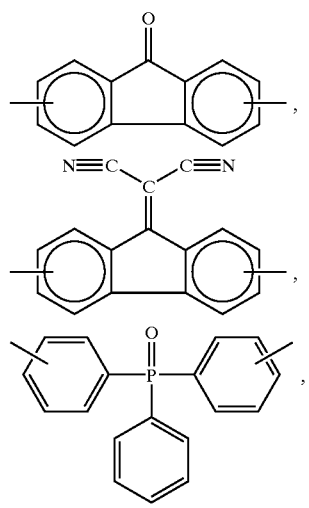
or mixtures thereof, B is
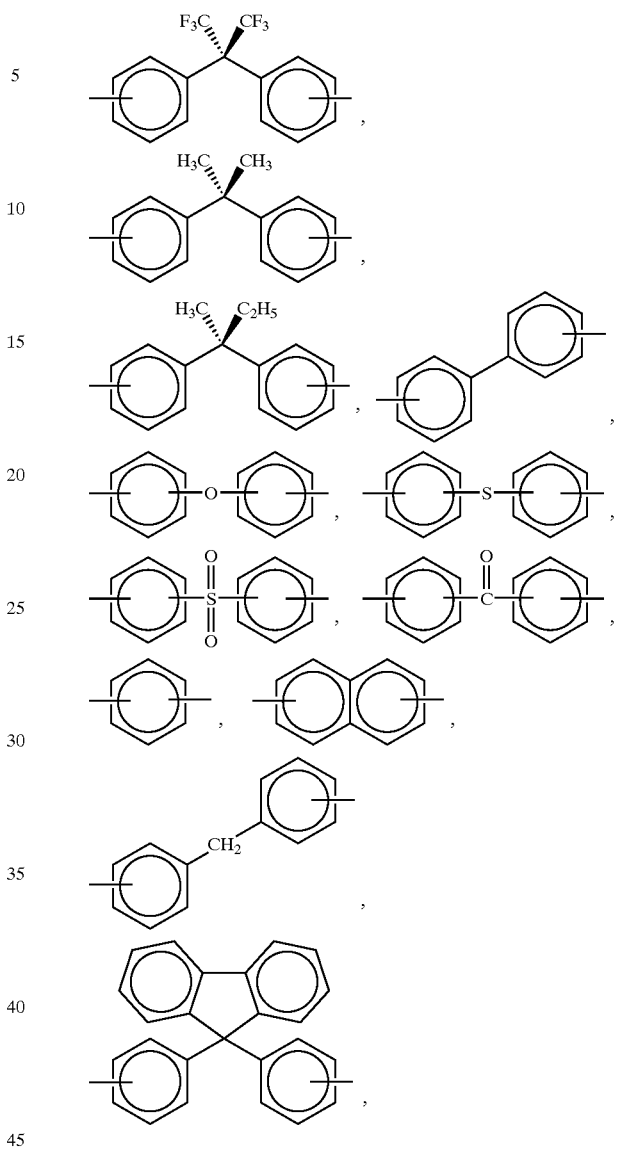
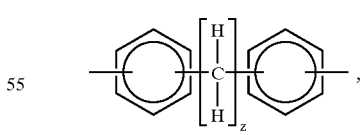
wherein v is an integer of from 1 to about 20, —(CH$_2$O)$_t$—
wherein t is an integer of from 1 to about 20,
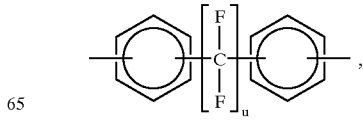
wherein z is an integer of from 2 to about 20, wherein u is an integer of from 1 to about 20,

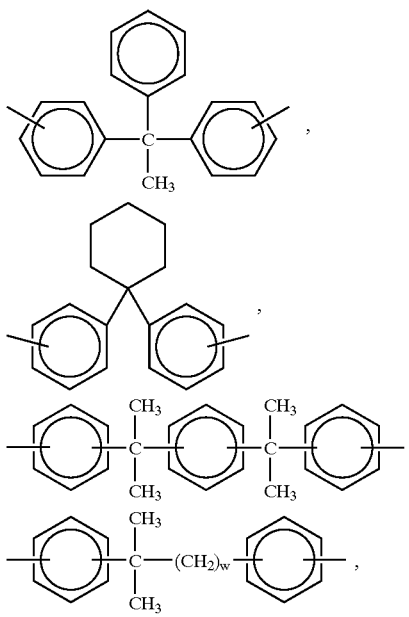

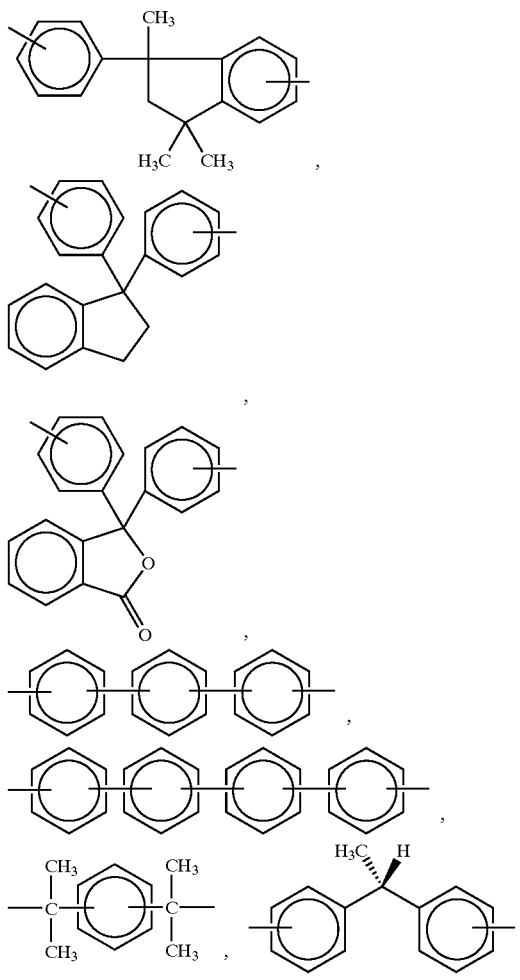

wherein w is an integer of from 1 to about 20,

—continued

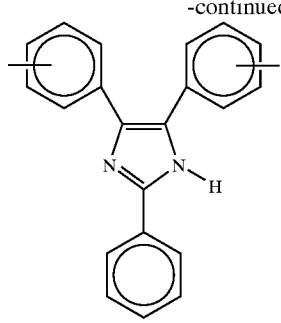

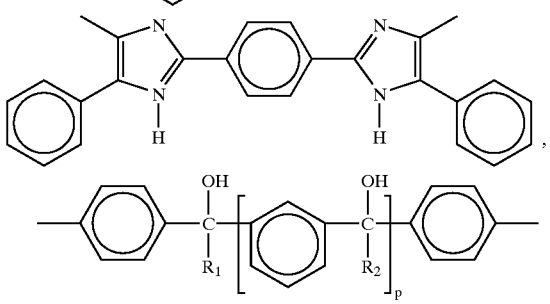

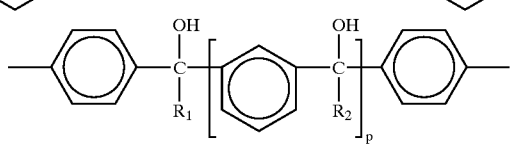

wherein $R_1$ and $R_2$ each, independently of the other, are hydrogen atoms, alkyl groups, aryl groups, or mixtures thereof, and p is an integer of 0 or 1,

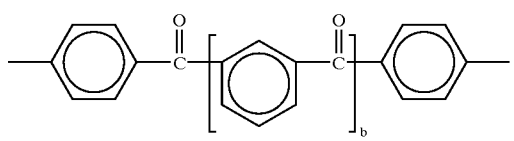

wherein b is an integer of 0 or 1, $$—Ar—N—Z{\left[N—Ar\right]}_q$$
$$\phantom{—Ar—N—Z}|\phantom{\left[}|\phantom{—Ar\right]}$$
$$\phantom{—Ar—N—Z}Ar^1\phantom{\left[}Ar^1\phantom{—Ar\right]}$$

wherein (1) Z is

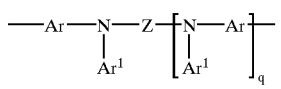

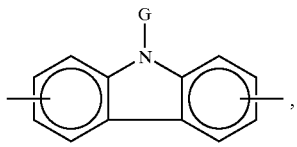

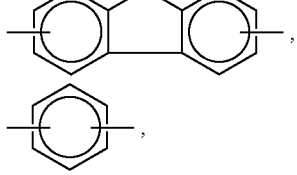

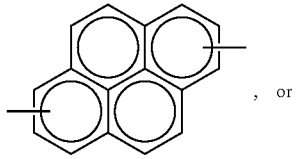, or

—Ar-(X)$_c$-Ar— wherein c is 0 or 1; (2) Ar is

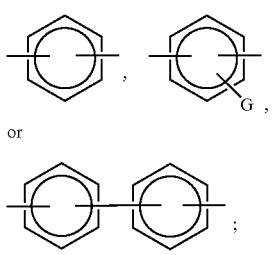

or (3) G is an alkyl group selected from alkyl or isoalkyl groups containing from about 2 to about 10 carbon atoms; (4) Ar' is

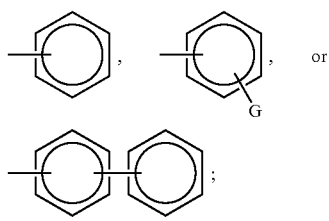

(5) X is

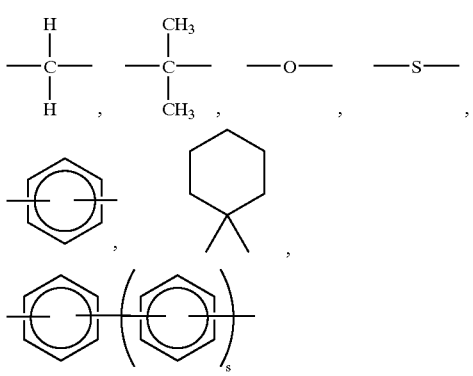

wherein s is 0, 1, or 2,

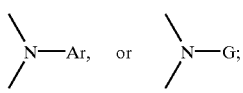

and (6) q is 0 or 1; or mixtures thereof, and n is an integer representing the number of repeating monomer units, said process comprising (A) providing a reaction mixture which comprises (i) a solvent, (ii) a compound of the formula $$F-\bigcirc-(A)_x-\bigcirc-F$$

or $$F-\bigcirc-F \atop (A)_x \atop \bigcirc$$

, (iii) a compound of the formula $$HO-[B]-OH,$$

(iv) a compound of the formula $$(R')_a-\bigcirc-OH$$

wherein a is an integer of from 1 to 5 and R' is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, or a mixture thereof, and (v) a carbonate base, and (B) heating the reaction mixture and removing generated water from the reaction mixture, thereby effecting a polymerization reaction.

DETAILED DESCRIPTION OF THE INVENTION

The present invention is directed to a process for preparing a polymer of the formula

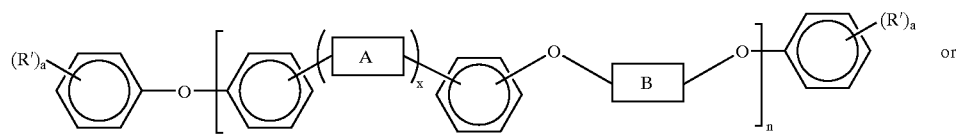

or

-continued

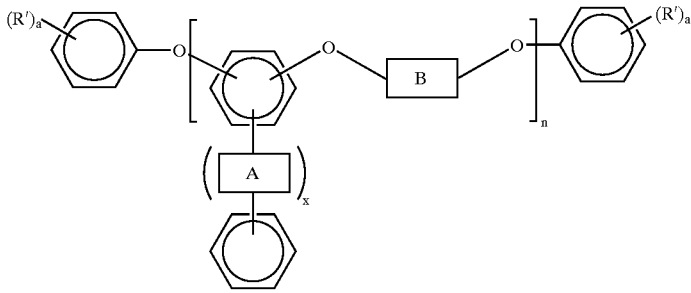

wherein x is an integer of 0 or 1, a is an integer of from 1 to 5, R' is a hydrogen atom, an alkyl group (including linear, branched, saturated, unsaturated, cyclic, and substituted alkyl groups, and wherein hetero atoms, such as oxygen, nitrogen, sulfur, silicon, phosphorus, and the like can be present in the alkyl group), typically with from 1 to about 20 carbon atoms, preferably with from 1 to about 8 carbon atoms, and more preferably with from 1 to about 4 carbon atoms, although the number of carbon atoms can be outside of these ranges, an aryl group (including substituted aryl groups), typically with from 2 to about 14 carbon atoms, and preferably with from about 6 to about 10 carbon atoms, an arylalkyl group (including substituted arylalkyl groups), typically with from 7 to about 50 carbon atoms, preferably with from 7 to about 23 carbon atoms, and more preferably with from 7 to about 11 carbon atoms, although the number of carbon atoms can be outside of these ranges, an alkylaryl group (including substituted alkylaryl groups), typically with from 7 to about 50 carbon atoms, preferably with from 7 to about 23 carbon atoms, and more preferably with from 7 to about 11 carbon atoms, although the number of carbon atoms can be outside of these ranges, an alkoxy group (including linear, branched, saturated, unsaturated, cyclic, and substituted alkoxy groups, and wherein hetero atoms, such as oxygen, nitrogen, sulfur, silicon, phosphorus, and the like can be present in the alkoxy group), typically with from 1 to about 20 carbon atoms, preferably with from 1 to about 8 carbon atoms, and more preferably with from 1 to about 4 carbon atoms, although the number of carbon atoms can be outside of these ranges, an aryloxy group (including substituted aryloxy groups), typically with from 6 to about 100 carbon atoms, preferably with from about 7 to about 23 carbon atoms, and more preferably with from about 7 to about 11 carbon atoms, although the number of carbon atoms can be outside of these ranges, an arylalkyloxy group (including substituted arylalkyloxy groups), typically with from 7 to about 100 carbon atoms, preferably with from 7 to about 23 carbon atoms, and more preferably with from 7 to about 11 carbon atoms, although the number of carbon atoms can be outside of these ranges, an alkylaryloxy group (including substituted alkylaryloxy groups), typically with from 7 to about 100 carbon atoms, preferably with from 7 to about 23 carbon atoms, and more preferably with from 7 to about 11 carbon atoms, although the number of carbon atoms can be outside of these ranges, a polyalkyleneoxy group, wherein each repeat alkylene oxide unit, independently of the others in the polyalkyleneoxy group, typically has from about 2 to about 100 carbon atoms, preferably with from about 2 to about 20 carbon atoms, and more preferably with from about 2 to about 6 carbon atoms, although the number of carbon atoms can be outside of these ranges, and wherein the polyalkyleneoxy group can contain two or more different kinds of repeat alkylene oxide repeat monomer units (such as block or random copolymers of polyethylene oxide and polypropylene oxide or the like), the polyalkyleneoxy group being typically with from 1 to about 500 repeat alkyleneoxy units, preferably with from 1 to about 10 repeat alkyleneoxy units, and more preferably with from 1 to about 4 repeat alkyleneoxy units, although the number of repeat alkyleneoxy units can be outside of these ranges, and wherein the substituents on the substituted alkyl, aryl, arylalkyl, alkylaryl, alkoxy, aryloxy, arylalkyloxy, alkylaryloxy, and polyalkyleneoxy groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, A is

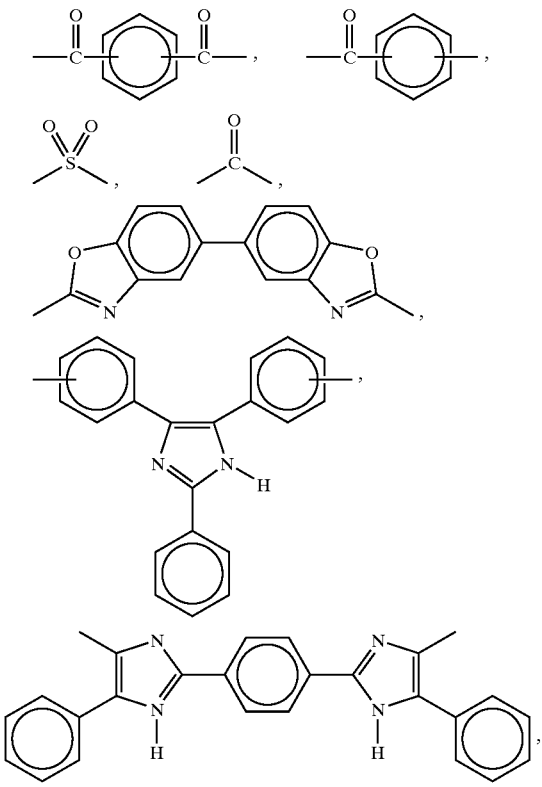

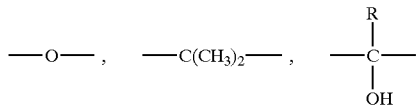

wherein R is a hydrogen atom, an alkyl group (including substituted alkyl groups, with examples of substituents including but not being limited to hydroxy or the like), typically with from 1 to about 20 carbon atoms, preferably with from 1 to about 10 carbon atoms, and more preferably with from 1 to about 5 carbon atoms, although the number of carbon atoms can be outside of this range, an aryl group (including substituted aryl groups, with examples of substituents including but not being limited to hydroxy or the like), typically with from 6 to about 18 carbon atoms, preferably with from 6 to about 12 carbon atoms, and more preferably with 6 carbon atoms, although the number of carbon atoms can be outside of this range, or mixtures thereof,

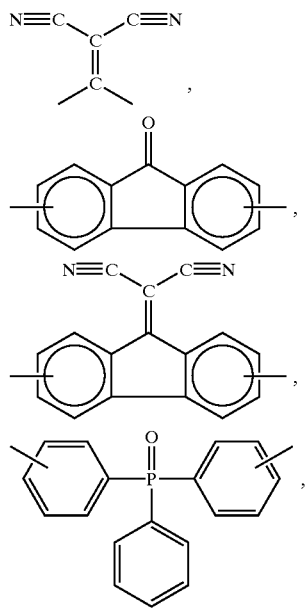

or mixtures thereof, B is

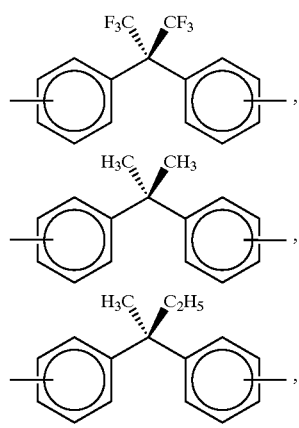

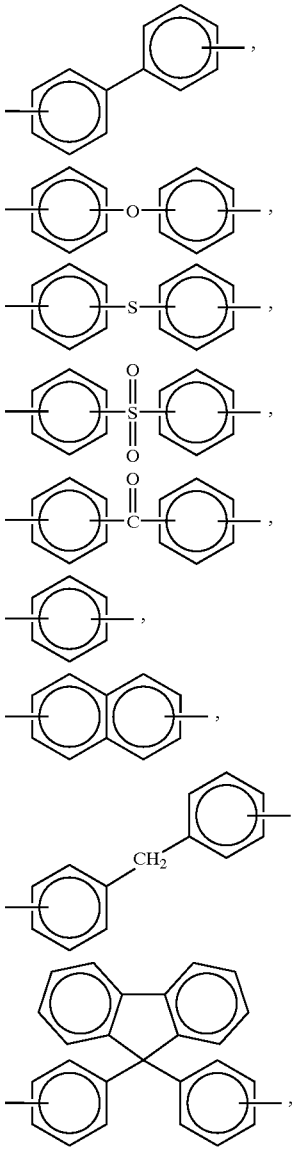

$-(CH_2)_v-$ wherein v is an integer of from 11 to about 20, $-(CH_2O)_t-$ wherein t is an integer of from 1 to about 20,

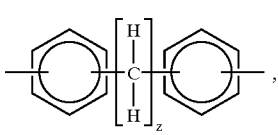

wherein z is an integer of from 2 to about 20,

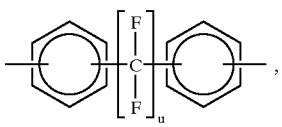

wherein u is an integer of from 1 to about 20,

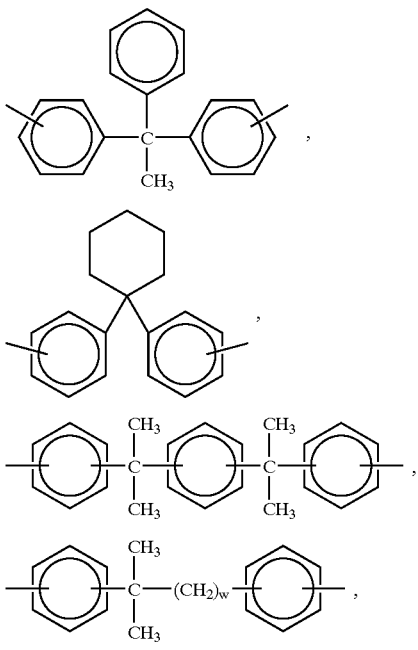

wherein w is an integer of from 1 to about 20,

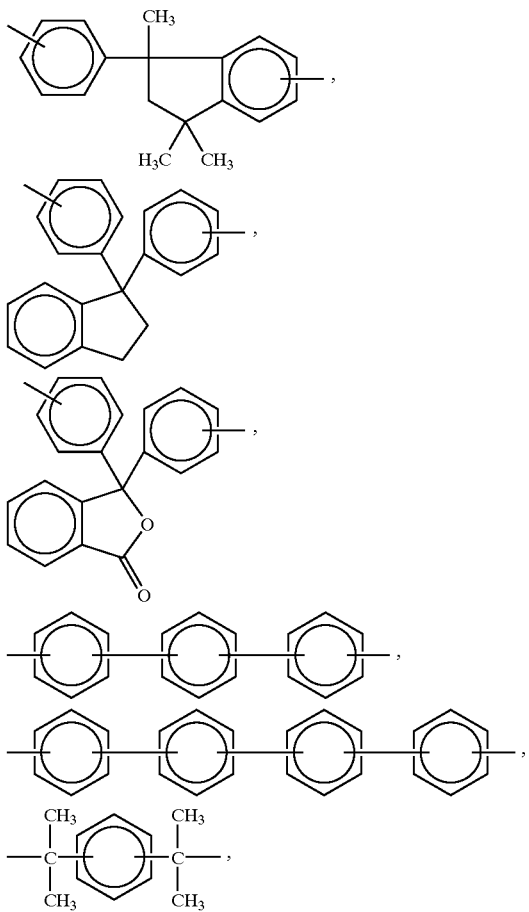

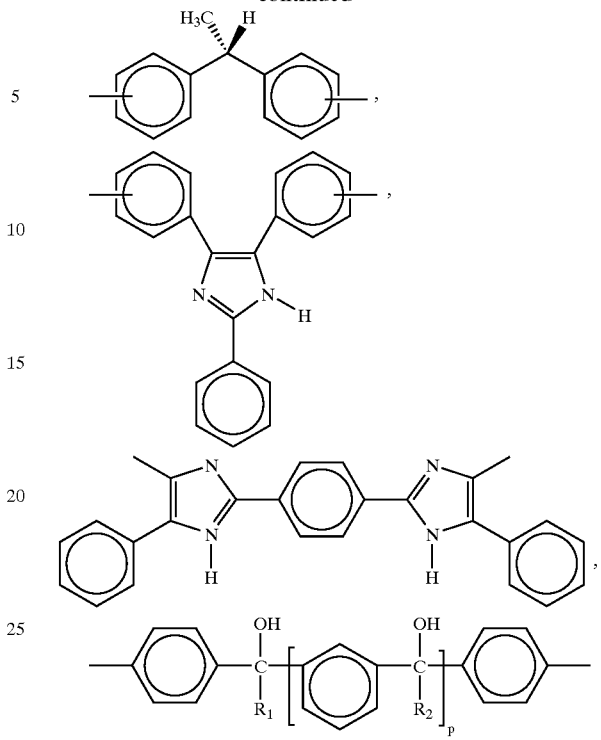

wherein $R_1$ and $R_2$ each, independently of the other, are hydrogen atoms, alkyl groups (including substituted alkyl groups, with examples of substituents including but not being limited to hydroxy or the like), typically with from 1 to about 20 carbon atoms, preferably with from 1 to about 10 carbon atoms, and more preferably with from 1 to about 5 carbon atoms, although the number of carbon atoms can be outside of this range, aryl groups (including substituted aryl groups, with examples of substituents including but not being limited to hydroxy or the like), typically with from 6 to about 18 carbon atoms, preferably with from 6 to about 12 carbon atoms, and more preferably with 6 carbon atoms, although the number of carbon atoms can be outside of this range, or mixtures thereof, and p is an integer of 0 or 1,

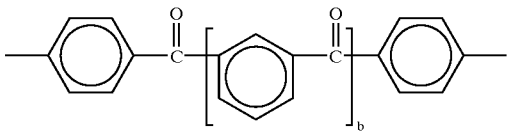

wherein b is an integer of 0 or 1,

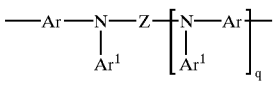

wherein (1) Z is

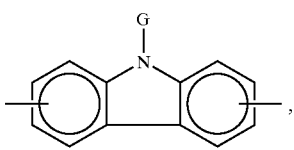

-continued

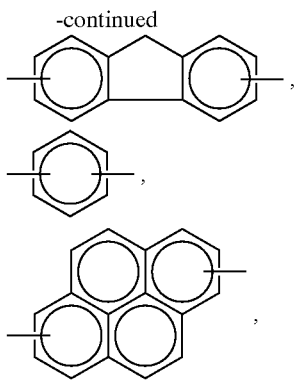

or —Ar-(X)$_c$Ar— wherein c is 0 or 1; (2) Ar is

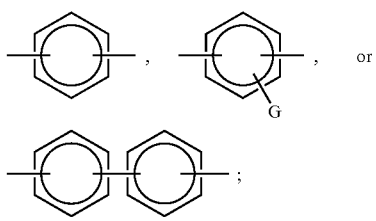

(3) G is an alkyl group selected from alkyl or isoalkyl groups containing from about 2 to about 10 carbon atoms, (4) Ar' is

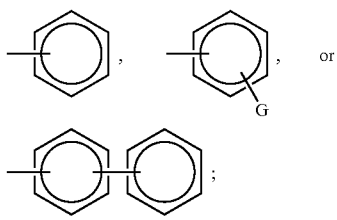

(5) X is

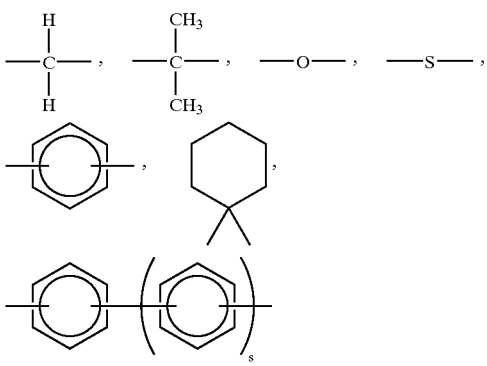

wherein s is 0, 1, or 2,

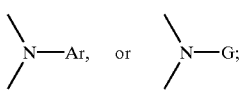

and (6) q is 0 or 1; or mixtures thereof, and n is an integer representing the number of repeating monomer units, said process comprising (A) providing a reaction mixture which comprises (i) a solvent, (ii) a compound of the formula

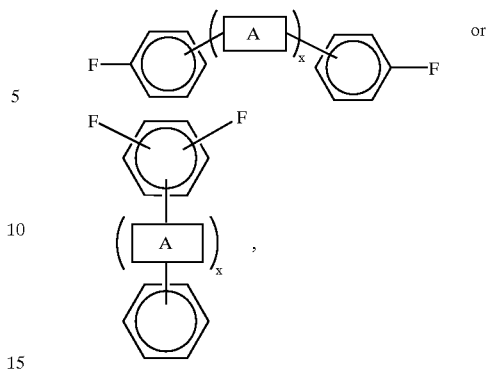

(iii) a compound of the formula

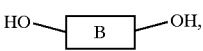

(iv) a compound of the formula

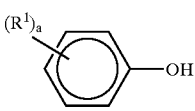

wherein a is an integer of from 1 to 5, R' is a hydrogen atom, an alkyl group (including linear, branched, saturated, unsaturated, cyclic, and substituted alkyl groups, and wherein hetero atoms, such as oxygen, nitrogen, sulfur, silicon, phosphorus, and the like can be present in the alkyl group), typically with from 1 to about 20 carbon atoms, preferably with from 1 to about 8 carbon atoms, and more preferably with from 1 to about 4 carbon atoms, although the number of carbon atoms can be outside of these ranges, an aryl group (including substituted aryl groups), typically with from 2 to about 14 carbon atoms, and preferably with from about 6 to about 10 carbon atoms, an arylalkyl group (including substituted arylalkyl groups), typically with from 7 to about 50 carbon atoms, preferably with from 7 to about 23 carbon atoms, and more preferably with from 7 to about 11 carbon atoms, although the number of carbon atoms can be outside of these ranges, an alkylaryl group (including substituted alkylaryl groups), typically with from 7 to about 50 carbon atoms, preferably with from 7 to about 23 carbon atoms, and more preferably with from 7 to about 11 carbon atoms, although the number of carbon atoms can be outside of these ranges, an alkoxy group (including linear, branched, saturated, unsaturated, cyclic, and substituted alkoxy groups, and wherein hetero atoms, such as oxygen, nitrogen, sulfur, silicon, phosphorus, and the like can be present in the alkoxy group), typically with from 1 to about 20 carbon atoms, preferably with from 1 to about 8 carbon atoms, and more preferably with from 1 to about 4 carbon atoms, although the number of carbon atoms can be outside of these ranges, an aryloxy group (including substituted aryloxy groups), typically with from 6 to about 100 carbon atoms, preferably with from about 7 to about 23 carbon atoms, and more preferably with from about 7 to about 11 carbon atoms, although the number of carbon atoms can be outside of these ranges, an arylalkyloxy group (including substituted arylalkyloxy groups), typically with from 7 to about 100 carbon atoms, preferably with from 7 to about 23 carbon atoms, and more preferably with from 7 to about 11 carbon atoms, although the number of carbon atoms can be outside of these ranges, an alkylaryloxy group (including substituted alkylaryloxy groups), typically with from 7 to about 100 carbon atoms, preferably with from 7 to about 23 carbon atoms, and more preferably with from 7 to about 11 carbon atoms, although the number of carbon atoms can be outside of these ranges, a polyalkyleneoxy group, wherein each repeat alkylene oxide unit, independently of the others in the polyalkyleneoxy group, typically has from about 2 to about 100 carbon atoms, preferably with from about 2 to about 20 carbon atoms, and more preferably with from about 2 to about 6 carbon atoms, although the number of carbon atoms can be outside of these ranges, and wherein the polyalkyleneoxy group can contain two or more different kinds of repeat alkylene oxide repeat monomer units (such as block or random copolymers of polyethylene oxide and polypropylene oxide or the like), the polyalkyleneoxy group being typically with from 1 to about 500 repeat alkyleneoxy units, preferably with from 1 to about 10 repeat alkyleneoxy units, and more preferably with from 1 to about 4 repeat alkyleneoxy units, although the number of repeat alkyleneoxy units can be outside of these ranges, and wherein the substituents on the substituted alkyl, aryl, arylalkyl, alkylaryl, alkoxy, aryloxy, arylalkyloxy, alkylaryloxy, and polyalkyleneoxy groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, and (v) a carbonate base; and (B) heating the reaction mixture and removing generated water from the reaction mixture, thereby effecting a polymerization reaction.

In the polymers of the above formulae, the phenyl groups and the A and/or B groups can also be substituted. Substituents can be placed thereon either prior to or subsequent to polymerization.

In the material of the formula

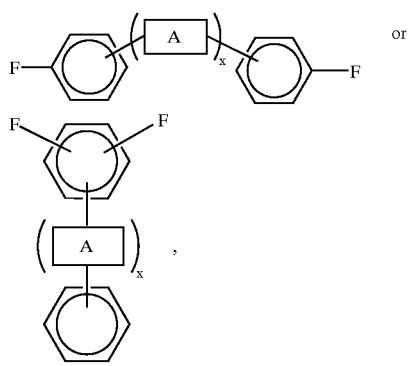 or x and "A" are as defined for the resulting polymer composition as set forth hereinabove. Specific examples of suitable materials of this formula include 4,4'-difluorobenzophenone, of the formula

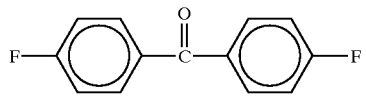

-continued 3,4'-difluorobenzophenone, of the formula

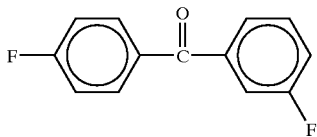

3,3'-difluorobenzophenone, of the formula

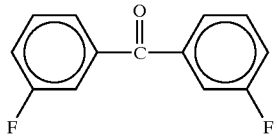

2,4'-difluorobenzophenone, of the formula

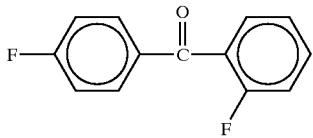

2,3'-difluorobenzophenone, of the formula

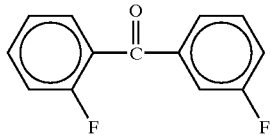

2,2'-difluorobenzophenone, of the formula

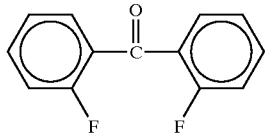

compounds of the formulae

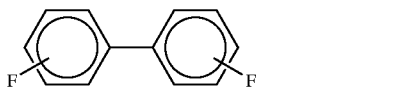

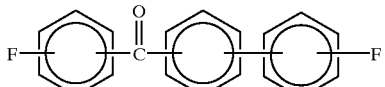

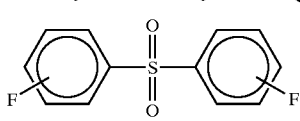

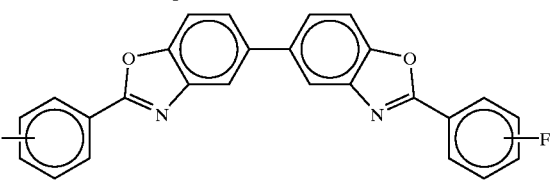

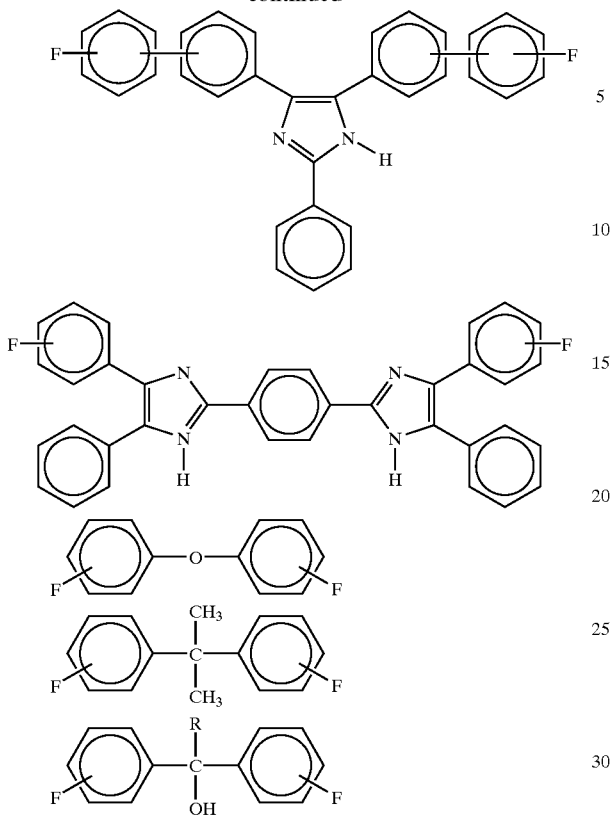
wherein R is a hydrogen atom, an alkyl group, an aryl group, or mixtures thereof,
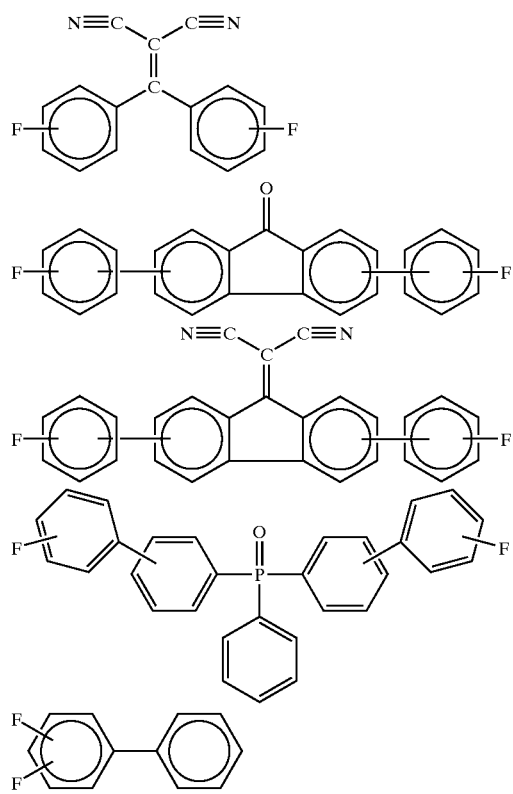
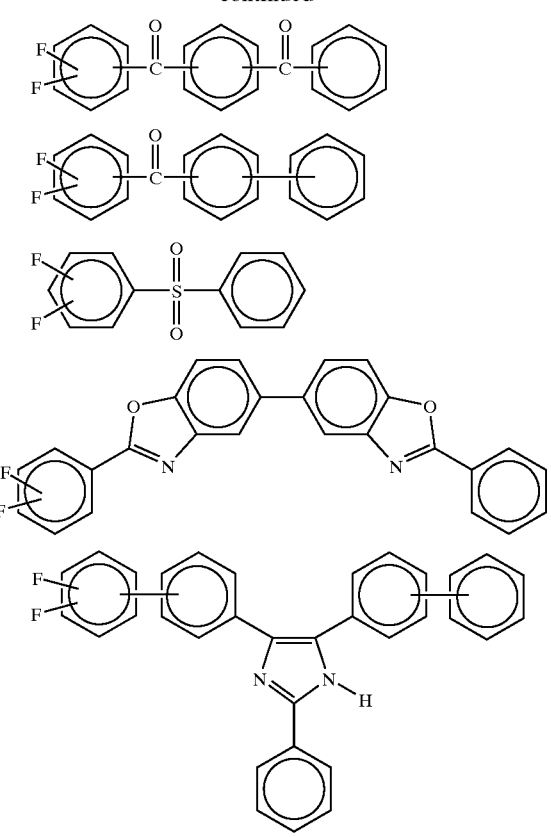
wherein R is a hydrogen atom, an alkyl group, an aryl group, or mixtures thereof,
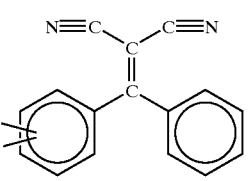

-continued

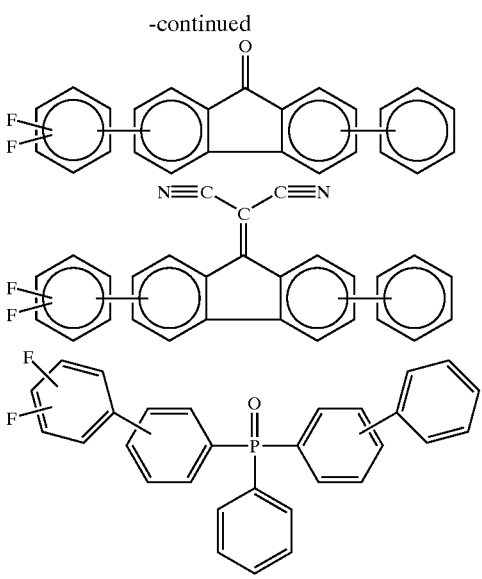

and the like. Mixtures of two or more compounds of this formula can also be employed.

In the material of the formula

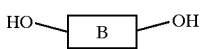

"B" is as defined for the resulting polymer composition as set forth hereinabove. Specific examples of suitable materials of this formula include those of the formula

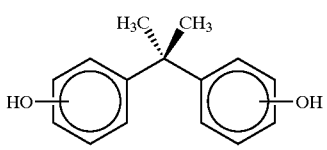

such as bisphenol-A, of the formula

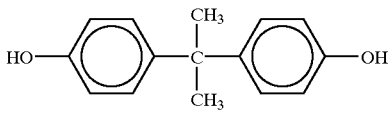

those of the formula

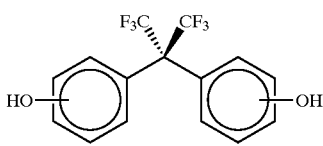

such as hexafluorobisphenol-A, of the formula

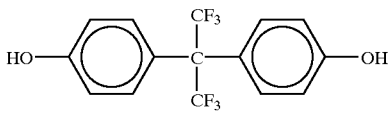

bisphenol-C, of the formula

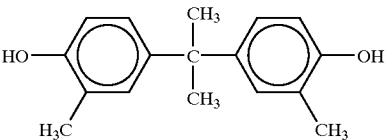

those of the formula

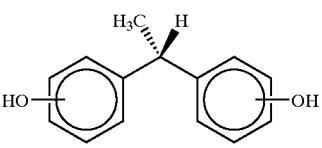

such as bisphenol-E, of the formula

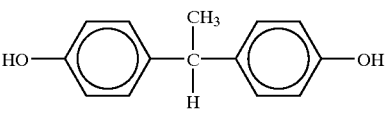

those of the formula

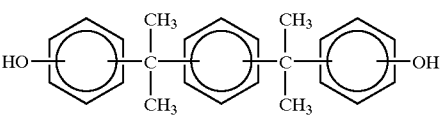

such as bisphenol-M, of the formula

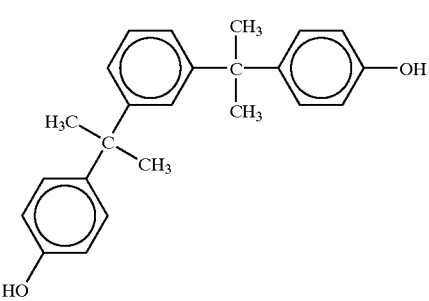

bisphenol-N, of the formula

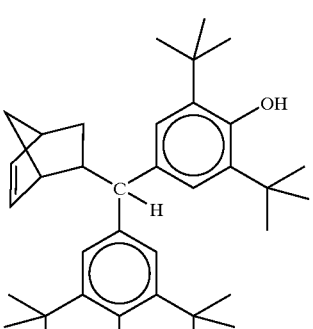

those of the formula

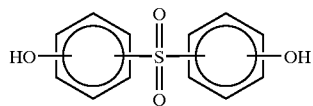

such as bisphenol-S, of the formula

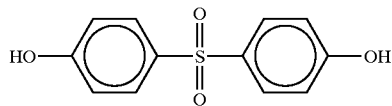

those of the formula

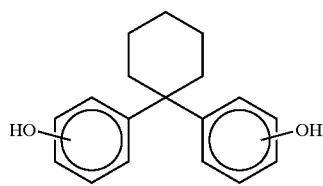

such as bisphenol-Z, of the formula

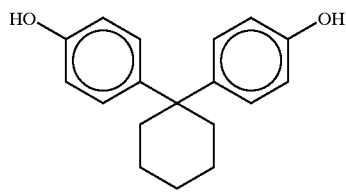

compounds of the formulae

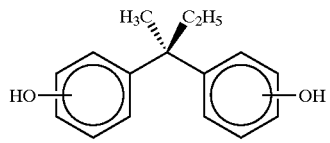

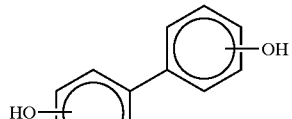

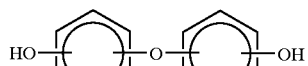

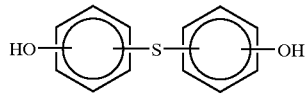

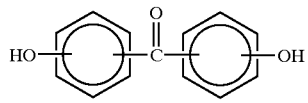

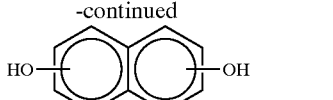

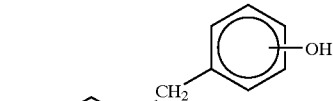

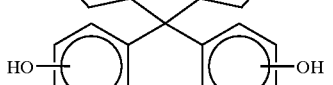

$HO\text{-}(CH_2)_v\text{-}OH$ wherein v is an integer of from 1 to about 20, $HO\text{-}(CH_2O)_t\text{-}OH$ wherein t is an integer of from 1 to about 20,

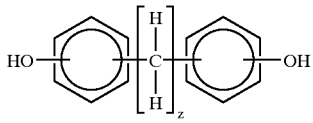

wherein z is an integer of from 2 to about 20,

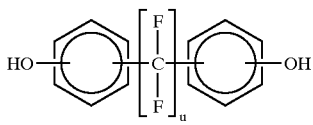

wherein u is an integer of from 1 to about 20,

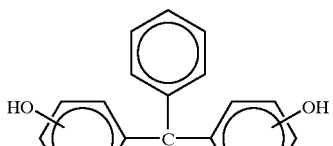

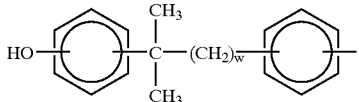

wherein w is an integer of from 1 to about 20,

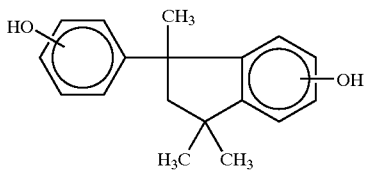

-continued

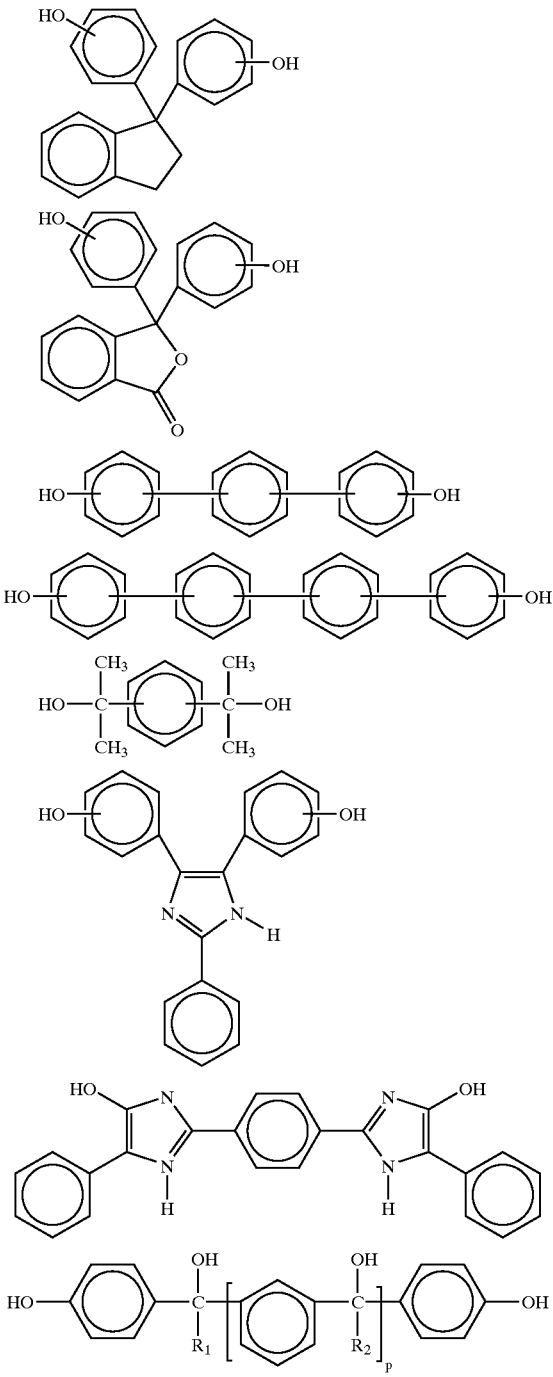

wherein $R_1$ and $R_2$ each, independently of the other, are hydrogen atoms, alkyl groups, aryl groups, or mixtures thereof, and p is an integer of 0 or 1,

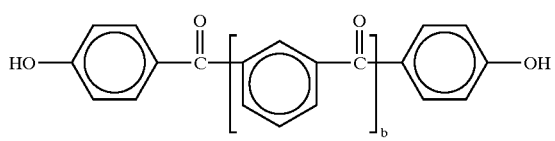

wherein b is an integer of 0 or 1,

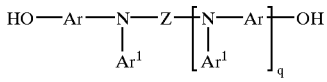

wherein Z, Ar, Ar', and q are as defined hereinabove with respect to the "B" groups, and the like. Mixtures of two or more compounds of this formula can also be employed.

In the material of the formula

a is an integer of from 1 to 5, preferably from 1 to about 3, and more preferably 1 and situated para to the hydroxy group, R' is a hydrogen atom, an alkyl group (including linear, branched, saturated, unsaturated, cyclic, and substituted alkyl groups, and wherein hetero atoms, such as oxygen, nitrogen, sulfur, silicon, phosphorus, and the like can be present in the alkyl group), typically with from 1 to about 20 carbon atoms, preferably with from 1 to about 8 carbon atoms, and more preferably with from 1 to about 4 carbon atoms, although the number of carbon atoms can be outside of these ranges, an aryl group (including substituted aryl groups), typically with from 2 to about 14 carbon atoms, and preferably with from about 6 to about 10 carbon atoms, an arylalkyl group (including substituted arylalkyl groups), typically with from 7 to about 50 carbon atoms, preferably with from 7 to about 23 carbon atoms, and more preferably with from 7 to about 11 carbon atoms, although the number of carbon atoms can be outside of these ranges, an alkylaryl group (including substituted alkylaryl groups), typically with from 7 to about 50 carbon atoms, preferably with from 7 to about 23 carbon atoms, and more preferably with from 7 to about 11 carbon atoms, although the number of carbon atoms can be outside of these ranges, an alkoxy group (including linear, branched, saturated, unsaturated, cyclic, and substituted alkoxy groups, and wherein hetero atoms, such as oxygen, nitrogen, sulfur, silicon, phosphorus, and the like) can be present in the alkoxy group, typically with from 1 to about 20 carbon atoms, preferably with from 1 to about 8 carbon atoms, and more preferably with from 1 to about 4 carbon atoms, although the number of carbon atoms can be outside of these ranges, an aryloxy group (including substituted aryloxy groups), typically with from 6 to about 100 carbon atoms, preferably with from about 7 to about 23 carbon atoms, and more preferably with from about 7 to about 11 carbon atoms, although the number of carbon atoms can be outside of these ranges, an arylalkyloxy group (including substituted arylalkyloxy groups), typically with from 7 to about 100 carbon atoms, preferably with from 7 to about 23 carbon atoms, and more preferably with from 7 to about 11 carbon atoms, although the number of carbon atoms can be outside of these ranges, an alkylaryloxy group (including substituted alkylaryloxy groups), typically with from 7 to about 100 carbon atoms, preferably with from 7 to about 23 carbon atoms, and more preferably with from 7 to about 11 carbon atoms, although the number of carbon atoms can be outside of these ranges, a polyalkyleneoxy group, wherein each repeat alkylene oxide unit, independently of the others in the polyalkyleneoxy group, typically has from about 2 to about 100 carbon atoms, preferably with from about 2 to about 20 carbon atoms, and more preferably with from about 2 to about 6 carbon atoms, although the number of carbon atoms can be outside of these ranges, and wherein the polyalkyleneoxy group can contain two or more different kinds of repeat alkylene oxide repeat monomer units (such as block or random copolymers of polyethylene oxide and polypropylene oxide or the like), the polyalkyleneoxy group being typically with from 1 to about 500 repeat alkyleneoxy units, preferably with from 1 to about 10 repeat alkyleneoxy units, and more preferably with from 1 to about 4 repeat alkyleneoxy units, although the number of repeat alkyleneoxy units can be outside of these ranges, and wherein the substituents on the substituted alkyl, aryl, arylalkyl, alkylaryl, alkoxy, aryloxy, arylalkyloxy, alkylaryloxy, and polyalkyleneoxy groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring. Specific examples of suitable materials of this formula include 2-methyl phenol, 3-methyl phenol, 4-methyl phenol, 2-ethyl phenol, 3-ethyl phenol, 4-ethyl phenol, 2-n-propyl phenol, 3-n-propyl phenol, 4-n-propyl phenol, 2-isopropyl phenol, 3-isopropyl phenol, 4-isopropyl phenol, 2-n-butyl phenol, 3-n-butyl phenol, 4-n-butyl phenol, 2-isobutyl phenol, 3-isobutyl phenol, 4-isobutyl phenol, 2-sec-butyl phenol, 3-sec-butyl phenol, 4-sec-butyl phenol, 2-t-butyl phenol, 3-t-butyl phenol, 4-t-butyl phenol, all possible isomers (including branched and linear) of pentyl phenol, all possible isomers (including branched and linear) of hexyl phenol, all possible isomers (including branched and linear) of heptyl phenol, all possible isomers (including branched and linear) of octyl phenol, all possible isomers (including branched and linear) of nonyl phenol, all possible isomers (including branched and linear) of decyl phenol, all possible isomers of undecyl phenol, all possible isomers (including branched and linear) of dodecyl phenol, 2-phenyl phenol, 3-phenyl phenol, 4-phenyl phenol, 2-tolyl phenol, 3-tolyl phenol, 4-tolyl phenol, 2-benzyl phenol, 3-benzyl phenol, 4-benzyl phenol, 2-methoxy phenol, 3-methoxy phenol, 4-methoxy phenol, 2-ethoxy phenol, 3-ethoxy phenol, 4-ethoxy phenol, 2-n-propoxy phenol, 3-n-propoxy phenol, 4-n-propoxy phenol, 2-isopropoxy phenol, 3-isopropoxy phenol, 4-isopropoxy phenol, 2-n-butoxy phenol, 3-n-butoxy phenol, 4-n-butoxy phenol, 2-isobutoxy phenol, 3-isobutoxy phenol, 4-isobutoxy phenol, 2-sec-butoxy phenol, 3-sec-butoxy phenol, 4-sec-butoxy phenol, 2-t-butoxy phenol, 3-t-butoxy phenol, 4-t-butoxy phenol, all possible isomers of pentyloxy phenol, all possible isomers (including branched and linear) of hexyloxy phenol, all possible isomers (including branched and linear) of heptyloxy phenol, all possible isomers (including branched and linear) of octyloxy phenol, all possible isomers (including branched and linear) of nonyloxy phenol, all possible isomers (including branched and linear) of decyloxy phenol, all possible isomers (including branched and linear) of undecyloxy phenol, all possible isomers (including branched and linear) of dodecylocy phenol, 2-phenoxy phenol, 3-phenoxy phenol, 4-phenoxy phenol, 2-tolyloxy phenol, 3-tolyloxy phenol, 4-tolyloxy phenol, 2-benzyloxy phenol, 3-benzyloxy phenol, 4-benzyloxy phenol, 2-(polyethyleneoxy) phenol, 3-(polyethyleneoxy) phenol, 4-(polyethyleneoxy) phenol, 2-(polypropyleneoxy) phenol, 3-(polypropyleneoxy) phenol, 4-(polypropyleneoxy) phenol, 2-(polybutyleneoxy) phenol, 3-(polybutyleneoxy) phenol, 4-(polybutyleneoxy) phenol, all 2,3-disubstituted variants of the above compounds, all 2,4-disubstituted variants of the above compounds, all 2–5-disubstituted variants of the above compounds, all 2–6-disubstituted variants of the above compounds, all 3,4-disubstituted variants of the above compounds, all 3,5-disubstituted variants of the above compounds, all 2,3,4-trisubstituted variants of the above compounds, all 2,3,5-trisubstituted variants of the above compounds, all 2,3,6-trisubstituted variants of the above compounds, all 2,4,5-trisubstituted variants of the above compounds, all 2,4,6-trisubstituted variants of the above compounds, all 3,4,5-trisubstituted variants of the above compounds, all 3,4,6-trisubstituted variants of the above compounds, all 2,3,4,5-tetrasubstituted variants of the above compounds, all 2,3,4,6-tetrasubstituted variants of the above compounds, all 2,3,5,6-tetrasubstituted variants of the above compounds, all pentasubstituted variants of the above compounds, and the like, as well as mixtures thereof.

The selected solvent can be any polar aprotic solvent suitable for this particular reaction. Examples of suitable solvents include N,N-dimethylacetamide, sulfolane (also called tetramethylene sulfone, or TMS), dimethyl formamide, dimethyl sulfoxide, N-methyl pyrrolidinone, hexamethylphosphoric triamide (HMPA), and the like, as well as mixtures thereof.

The carbonate base can be any desired material, such as lithium carbonate, sodium carbonate, potassium carbonate, cesium carbonate, or the like, with potassium carbonate and cesium carbonate being preferred. The carbonate base is present in the reaction mixture in any desired or effective amount, typically at least about 1.05 moles of carbonate base per every one mole of the compound

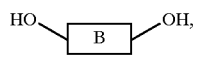

preferably at least about 1.1 moles of carbonate base per every one mole of the compound

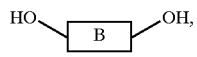

and more preferably at least about 1.2 moles of carbonate base per every one mole of the compound

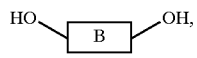

and typically no more than about 2 moles of carbonate base per every one mole of the compound

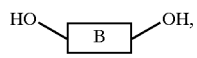

preferably no more than about 1.5 moles of carbonate base per every one mole of the compound

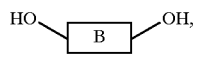

and more preferably no more than about 1.3 moles of carbonate base per every one mole of the compound

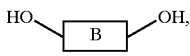

although the amount can be outside of these ranges.

The material of the formula

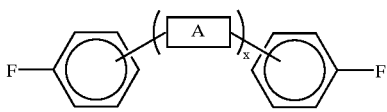

the material of the formula

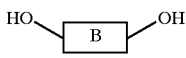

and the material of the formula

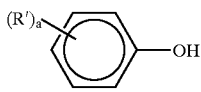

are each present in the reaction mixture in amounts such that the total solids content (i.e. the sum total amount of each of these three materials) in the reaction mixture is typically from about 1 to about 75 percent by weight solids content, preferably from about 20 to about 50 percent by weight solids content, and more preferably from about 25 to about 45 percent by weight solids content, although the solids content of the reaction mixture can be outside of these ranges.

The reaction mixture is heated to a temperature at which reflux occurs. This temperature typically depends on the solvent employed and on the pressure at which the reaction is carried out. For example, when carried out at 1 atmosphere of pressure with an N,N-dimethylacetamide solvent, the reaction temperature is typically at least about 145° C., preferably at least about 155° C., and more preferably at least about 160° C., and to a temperature of typically no more than about 200° C., preferably no more than about 180° C., and more preferably no more than about 170° C., although the temperature can be outside of these ranges.

Heating of the reaction mixture occurs for any period of time effective to complete the polymerization reaction. Completion of the reaction can be determined when 3 consecutive samples of polymer taken from the reactor at periods of from about 10 to about 30 minutes apart exhibit about the same molecular weight value (+about 500 Daltons) and about the same polydispersity value (+about 2). Reaction times typically are at least about 4 hours, preferably at least about 6 hours, and more preferably at least about 8 hours, and typically no more than about 10 hours, preferably no more than about 9 hours, and more preferably no more than about 8.5 hours, although the reaction time can be outside of these ranges.

Water is generated during the polymerization reaction, and this water is removed from the reaction mixture because of the instability of phenoxide compounds in the presence of water. One method of removing water is by azeotropic distillation with a solvent such as toluene. Any other desired or effective method for removing water from the reaction mixture can also be employed. The toluene is present in the reaction mixture in any effective amount, typically at least about 1 percent by weight of the reactor contents, and preferably at least about 12 percent by weight of the reactor contents, and typically no more than about 30 percent by weight of the reactor contents, and preferably no more than about 15 percent by weight of the reactor contents, although the amount of toluene can be outside of these ranges.

The polymer formed by the process of the present invention can be of any desired molecular weight. In one specific embodiment, the weight average molecular weight (Mw) in Daltons is typically at least about 10,000, preferably at least about 12,000, and more preferably at least about 14,000, and is typically no more than about 20,000, preferably no more than about 18,000, and more preferably no more than about 16,000, although the weight average molecular weight can be outside of these ranges. In one specific embodiment, the number average molecular weight (Mn) is typically at least about 5,000, preferably at least about 6,000, and more preferably at least about 7,000, and is typically no more than about 12,000, preferably no more than about 10,000, and more preferably no more than about 6,500, although the number average molecular weight can be outside of these ranges.

Molecular weight values recited herein are values measured using gel permeation chromatography and are relative to polystyrene standards.

In specific embodiments of the present invention, the polymer formed by the process exhibits a desirably low polydispersity value. Polydispersity is calculated as the weight average molecular weight divided by the number average molecular weight. In specific embodiments, the polydispersity typically is no more than about 2.7, preferably no more than about 2.5, and more preferably no more than about 2.3, although the polydispersity can be outside of these ranges. There is no preferred lower limit on desirable polydispersity.

The difluorinated material of the formula

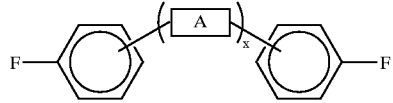

and the dihydroxylated material of the formula

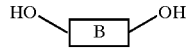

are present in the reaction mixture in any desired or effective relative amounts. Typically, the ratio of difluorinated material to dihydroxylated material is at least about 1.02 moles of difluorinated material per one mole of dihydroxylated material, preferably at least about 1.06 moles of difluorinated material per one mole of dihydroxylated material, and more preferably at least about 1.08 moles of difluorinated material per one mole of dihydroxylated material, and typically no more than about 1.15 moles of difluorinated material per one mole of dihydroxylated material, preferably no more than about 1.12 moles of difluorinated material per one mole of dihydroxylated material, and more preferably no more than about 1.10 moles of difluorinated material per one mole of dihydroxylated material, although the relative amounts of difluorinated material and dihydroxylated material can be outside of these ranges. Higher molar excesses of difluorinated material per one mole of dihydroxylated material generally tend to result in polymers of lower molecular weight, for example, if the ratio of difluorinated material to dihydroxylated material is 1.15:1, the resulting polymer is expected to be of lower molecular weight than if the ratio of difluorinated material to dihydroxylated material is 1.02:1.

The dihydroxylated material of the formula

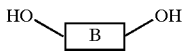

and the monofunctional phenol compound of the formula

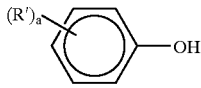

are present in the reaction mixture in any desired or effective relative amounts. Typically, the ratio of dihydroxylated material to monofunctional phenol is at least about 2 moles of dihydroxylated material per one mole of monofunctional phenol, preferably at least about 4 moles of dihydroxylated material per one mole of monofunctional phenol, and more preferably at least about 6 moles of dihydroxylated material per one mole of monofunctional phenol, and typically no more than about 10 moles of dihydroxylated material per one mole of monofunctional phenol, preferably no more than about 8 moles of dihydroxylated material per one mole of monofunctional phenol, and more preferably no more than about 7 moles of dihydroxylated material per one mole of monofunctional phenol, although the relative amounts of dihydroxylated material and monofunctional phenol can be outside of these ranges. Lower molar amounts of dihydroxylated material per one mole of monofunctional phenol generally tend to result in polymers of lower molecular weight, for example, if the ratio of dihydroxylated material to monofunctional phenol is 2:1, the resulting polymer is expected to be of lower molecular weight than if the ratio of dihydroxylated material to monofunctional phenol is 10:1.

The difluorinated material of the formula

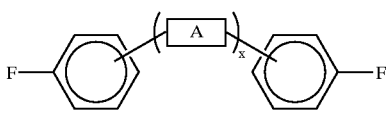

and the monofunctional phenol compound of the formula

are present in the reaction mixture in any desired or effective relative amounts. Typically, the ratio of difluorinated material to monofunctional phenol is at least about 2 moles of difluorinated material per one mole of monofunctional phenol, preferably at least about 4 moles of difluorinated material per one mole of monofunctional phenol, and more preferably at least about 6 moles of difluorinated material per one mole of monofunctional phenol, and typically no more than about 10 moles of difluorinated material per one mole of monofunctional phenol, preferably no more than about 8 moles of difluorinated material per one mole of monofunctional phenol, and more preferably no more than about 7 moles of difluorinated material per one mole of monofunctional phenol, although the relative amounts of difluorinated material and monofunctional phenol can be outside of these ranges. Lower molar amounts of difluorinated material per one mole of monofunctional phenol generally tend to result in polymers of lower molecular weight; for example, if the ratio of difluorinated material to monofunctional phenol is 2:1, the resulting polymer is expected to be of lower molecular weight than if the ratio of difluorinated material to monofunctional phenol is 10:1.

While not being limited to any particular theory, it is believed that the chain extending reaction occurs when the carbonate base (potassium carbonate in the illustrated examples) reacts with the hydroxy groups on the "B" moiety to form a salt:

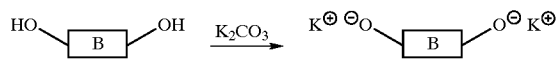

Thereafter, the dihydroxylated "B" moiety initiates a nucleophilic aromatic substitution reaction, as follows:

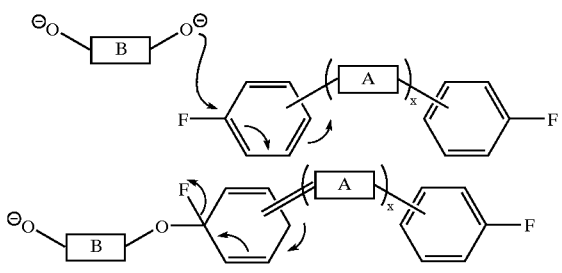

For example, when the "A" group is >C=O, x is 1, and the bond between the phenyl group and the "A" group is para to the fluorine atom, this process occurs as follows:

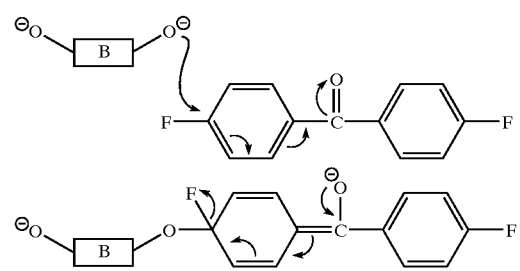

The "B" moiety thus becomes bonded through the oxygen atom to the phenyl ring on the "A" moiety:

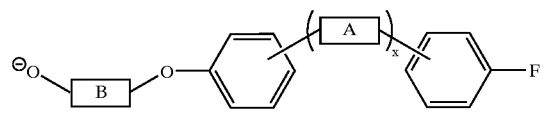

and a polymer chain is formed:

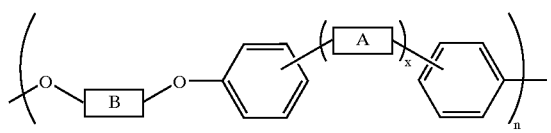

The reaction involving the endcapping phenolic compound (illustrated) here for a compound having a single R' group) is believed to proceed by a similar mechanism:

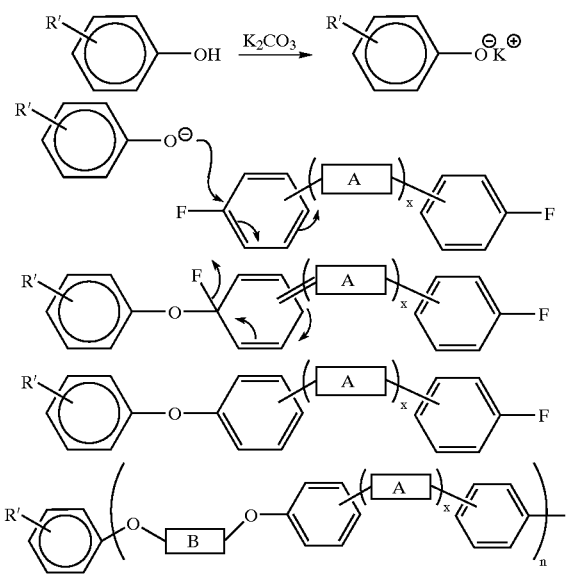

It is also believed that the endcapping phenolic compound can initiate a chain cleavage reaction with formed polymer chains, as follows:

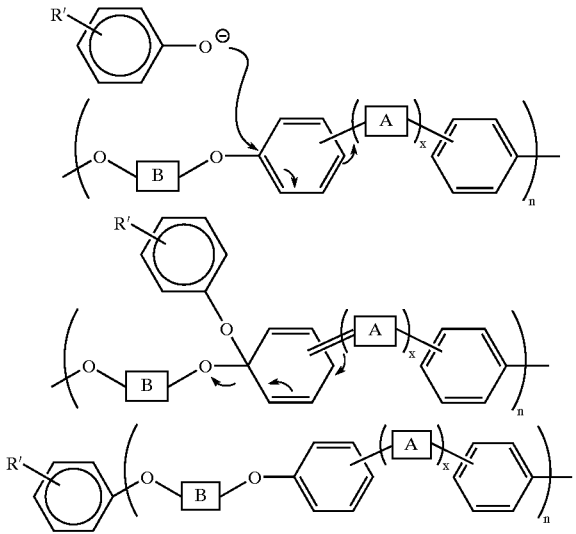

Accordingly, the endcapping monofunctional phenol compound can be added to the reaction mixture with the other reactants at the beginning of the reaction. In other polymer systems, the endcapping agent cannot be introduced so early in the reaction, because once the endcapping agent reacts, it is consumed. This consumption of the endcapping agent could result in the formation of many short chains that are "dead" because they are capped at both ends. The endcapping monofunctional phenol compound used in the process of the present invention, however, cleaves the existing phenolic ether bonds, so that there is a constant scrambling of the resin chains in an equilibrium state. Accordingly, the monofunctional phenol endcapping agent works effectively even if it is added at the beginning of the reaction, and it does not broaden the molecular weight distribution of the system. In addition, the endcapping agent can control the polydispersity and the molecular weight of the resulting polymer by establishment of an equilibrium that balances all of the thermodynamic forces at play in the system.

The molecular weight of the polyarylene ethers prepared by the process of the present invention can be controlled by varying the stoichiometry of the starting materials, and during the process the molecular weight reaches a nearly constant value after which it does not rise further. Accordingly, it is not necessary for those carrying out the reaction to monitor it closely so that the desired molecular weight is achieved. In some embodiments, the relative rapidity of the reaction also enables it to be completed within an 8 hour work shift, Since little or no monitoring of the reaction is required, supervision of the reaction is simplified, there is no need to open the reactor to sample the reaction mixture. This operation simplification also enables the use of simplified hardware and equipment. In addition, polyarylene ethers with desirably narrow polydispersity values can be prepared by the process of the present invention; in photoresist applications, narrower polydispersity values enable the formation of sharper images. Further, in some embodiments, the polyarylene ethers formed by the process of the present invention exhibit an absence of fluorine terminal or end groups; the presence of fluorine in the polymer can sometimes adversely affect its physical properties, so the absence of fluorine is a distinct advantage.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Potassium carbonate (437.7 grams, 3.167 mol; obtained from Caledon Laboratories, Georgetown, Ontario), bisphenol-A (302.9 grams, 1.327 mol; obtained from Shell Canada Chemical Co., Calgary, Alberta), 4,4'-difluorobenzophenone (312.9 grams, 1.434 mol; obtained from Oakwood Chemicals, West Columbia, S. C. and Honeywell Specialty Chemicals, Morristown, N. J.), 4-t-butyl phenol (32.4 grams, 0.216 mol; obtained from Aldrich Chemical Canada, Oakville, Ontario), toluene (173.0 grams, 200.0 milliliters; obtained from Caledon Laboratories, Georgetown, Ontario), and N,N-dimethylacetamide (1894.0 grams, 2021.3 milliliters; obtained from Aldrich Chemical Canada, Oakville, Ontario) were added to a 3-necked 5 liter Morton flask fitted with a Claisen adapter, nitrogen bubbler, submersible thermometer, and 500 milliliter still head containing toluene (370 milliliters) topped with a water-jacketed condenser. The reaction mixture was agitated mechanically at 500 rpm using an IKA RW 20 DZM.n overhead stirrer with glass stir rod and TEFLON® blade. The reaction mixture was refluxed for 6 hours under a slow nitrogen purge while the distillate was allowed to recirculate into the reaction flask while periodically draining the produced water. After air cooling to room temperature, the reaction mixture was diluted with 1 liter of N,N-dimethylacetamide and vacuum filtered through #4 Whatman filter paper and added gradually to 30 liters of vigorously stirring methanol (obtained from Caledon Laboratories, Georgetown, Ontario). The precipitate was isolated by vacuum filtration through # 1 Whatman filter paper, followed by stirring in 5 liters of deionized water for 1 hour, refiltration, subsequent stirring in 5 liters of methanol for 1 hour, and a final filtration. The precipitate was dried in a vacuum oven (30° C., 7 mtorr) for three days to yield a white free flowing powder (558 grams, 3.00 percent volatiles, 90.0 percent yield). $^1$H and $^{19}$F NMR spectrographs indicated that the resulting polymer had no terminal fluorine groups, and the presence of a monophenolic endgroup in the appropriate stoichiometry was confirmed.

EXAMPLE II

A 5 gallon (20 liter) stainless steel reactor was equipped with a distillation condenser, an external piping loop to act as a water separator, an electrically driven agitator, a means to purge with nitrogen and a means to draw samples. There was a return line from the separator to the reactor to recirculate the distillate back into the reactor. The reactor was purged with nitrogen and the agitator started at minimum speed. The nitrogen purge was then stopped and a standard batch charge was added through the loading port in the following sequence: N,N-dimethylacetamide (13 kilograms), toluene (4 kilograms), 4-t-butyl phenol (0.214 kilograms), 4,4'-difluorobenzophenone (2.064 kilograms), bisphenol-A (1.999 kilograms), and $K_2CO_3$ (2.60 kilograms). The loading port was closed and the reactor was purged for 5 minutes with nitrogen and then switched to the vent line for the remainder of the reaction. Heat was applied to the reactor using a 60 kilowatt hot oil system with the hot oil temperature being controlled in automatic mode using a slave controller (hot oil setpoint 175° C.). Time zero for the process was set to the time at which distillation begins (reaction temperature 150° C.). Over the first 1 hour, removal of the denser phase of distillate (a total of 4 liters is collected) was performed as the hot oil temperature was gradually increased to 190° C. Once the internal temperature of the reactor was 165° C, all subsequent distillate was returned to the reactor. Sampling of the reaction for analysis by GPC was done using vacuum to draw a sample into a small vessel connected to a dip-tube. The reaction was run for 6 hours after achieving 150° C. and the reactor was then cooled to 25° C. The product mixture was pressure filtered to remove residual potassium salts through a bag filter attached to the bottom valve. The solid collected in the bag filter was rinsed with fresh N,N-dimethylacetamide charged to the reactor. The N,N-dimethylacetamide solution was then precipitated into highly agitated methanol (10 volume equivalents to N,N-dimethylacetamide). The resulting powder was isolated by vacuum filtration (in a Buchner-type apparatus) and washed with water (20 kilograms) and methanol (20 kilograms) in the filter. The resulting cake was dried in a tray drier at 60° C. under vacuum until a constant weight was achieved (yield 3.1 kilograms; 81 percent theoretical yield 3.8 kilograms). $^1$H and $^{19}$F NMR spectrographs indicated that the resulting polymer had no terminal fluorine groups, and the presence of a monophenolic endgroup in the appropriate stoichiometry was confirmed.

EXAMPLE III (COMPARATIVE)

Potassium carbonate (87.5 grams, 0.634 mol), bisphenol-A (60.6 grams, 0.265 mol), 4,4'-difluorobenzophenone (62.6 grams, 0.287 mol), toluene (34.6 grams, 40.0 milliliters), and N,N-dimethylacetamide (374.8 grams, 400.0 milliliters) were added to a 3-necked 1 liter Morton flask equipped with a Claisen adapter, nitrogen bubbler, submersible thermometer, and 25 milliliter Dean-Stark trap topped with a water-jacketed condenser. The reaction mixture was agitated mechanically at 500 rpm using an IKA RW 20 DZM.n overhead stirrer with glass stir rod and TEFLON® blade. The reaction mixture was refluxed for 6 hours under a slow nitrogen purge. Time zero was taken as the time at which drops of distillate were first observed in the Dean-Stark trap. After air-cooling the reaction to room temperature, the reaction mixture was diluted with tetrahydrofuran (259 milliliters) and poured slowly into vigorously stirring methanol (2 liters) to precipitate the resin product. The precipitate was isolated by vacuum filtration through #54 Whatman filter paper, redissolved in dichloromethane (obtained from Caledon Laboratories, Georgetown, Ontario; 2 liters) and stirred with CELITE® 521 (50 grams) for 1 hour. The solution was then filtered through #54 Whatman paper to remove the CELITE® and salts. The filtrate was added slowly to vigorously stirring methanol (4 liters) to reprecipitate the resin. The precipitate was isolated by vacuum filtration through #54 Whatman filter paper, followed by vacuum drying to yield 100.5 grams of resin containing 1.48 percent volatiles (83.8 percent yield). This polymer was prepared in the absence of a monofunctional phenol; $^{19}$F NMR spectrographs indicated that the resulting polymer had terminal fluorine groups.

EXAMPLE IV

Potassium carbonate (87.5 grams, 0.634 mol), bisphenol-A (60.6 grams, 0.265 mol), 4,4'-difluorobenzophenone (62.6 grams, 0.292 mol), 4-t-butyl phenol (8.1 grams, 0.054 mol), toluene (34.6 grams, 40.0 milliliters), and N,N-dimethylacetamide (374.8 grams, 400.0 milliliters) were added to a 3-necked 1 liter Morton flask equipped with a Claisen adapter, nitrogen bubbler, submersible thermometer, and 25 milliliter Dean-Stark trap topped with a water-jacketed condenser. The reaction mixture was agitated mechanically at 500 rpm using an IKA RW 20 DZM.n overhead stirrer with glass stir rod and TEFLON® blade. The reaction mixture was refluxed for 6 hours under a slow nitrogen purge. Time zero was taken as the time at which drops of distillate were first observed in the Dean-Stark trap. After air-cooling the reaction to room temperature, the reaction mixture was diluted with tetrahydrofuran (259 milliliters) and poured slowly into vigorously stirring methanol (2 liters) to precipitate the resin product. The precipitate was isolated by vacuum filtration through #54 Whatman filter paper, redissolved in dichloromethane, and stirred with CELITE® (50 grams) for 1 hour. The solution was then filtered through #54 Whatman paper to remove the CELITE® and salts. The filtrate was added slowly to vigorously stirring methanol (4 liters) to reprecipitate the resin. The precipitate was isolated by vacuum filtration through #54 Whatman filter paper, followed by vacuum drying to yield the resin (about 80 percent yield). $^1$H and $^{19}$F NMR spectrographs indicated that the resulting polymer had no terminal fluorine groups, and the presence of a monophenolic endgroup in the appropriate stoichiometry was confirmed. GPC confirmed that the molecular weight of the isolated resin reached a maximum of 12,000 Daltons within about 3½ hours with a polydispersity of 2.03, compared to a maximum of 14,000 Daltons within about 4½ hours when the reaction was run with the stoichiometric ratios set forth in Example I.

EXAMPLE V

Potassium carbonate (87.5 grams, 0.634 mol), hexafluorobisphenol-A (89.1 grams, 0.265 mol, available from Aldrich Chemical Company, Oakville, Ontario, Canada), 4,4'-difluorobenzophenone (62.6 grams, 0.287 mol), 4-t-butyl phenol (6.6 grams, 0.044 mol), toluene (34.6 grams, 40.0 milliliters), and N,N-dimethylacetamide (374.8 grams, 400.0 milliliters) are added to a 3-necked 1 liter Morton flask equipped with a Claisen adapter, nitrogen bubbler, submersible thermometer, and 25 milliliter Dean-Stark trap topped with a water-jacketed condenser. The reaction mixture is agitated mechanically at 500 rpm using an IKA RW 20 DZM.n overhead stirrer with glass stir rod and TEFLON® blade. The reaction mixture is refluxed for 6 hours under a slow nitrogen purge. Time zero is taken as the time at which drops of distillate are first observed in the Dean-Stark trap. After air-cooling the reaction to room temperature, the reaction mixture is diluted with tetrahydrofuran (259 milliliters) and poured slowly into vigorously stirring methanol (2 liters) to precipitate the resin product. The precipitate is isolated by vacuum filtration through #54 Whatman filter paper, redissolved in dichloromethane, and stirred with CELITE® 521 (50 grams) for 1 hour. The solution is then filtered through #54 Whatman paper to remove the CELITE® and salts. The filtrate is added slowly to vigorously stirring methanol (4 liters) to reprecipitate the resin, The precipitate is isolated by vacuum filtration through #54 Whatman filter paper, followed by vacuum drying to yield the resin. It is believed that $^1$H and $^{19}$F NMR spectrographs will indicate that the resulting polymer has no terminal fluorine groups, and that the presence of a monophenolic endgroup in the appropriate stoichiometry will be confirmed.

EXAMPLE VI

Potassium carbonate (87.5 grams, 0.634 mol), bisphenol-A (60.6 grams, 0.265 mol), bis(4-fluorophenyl)phenylphosphine oxide (90.2 grams, 0.287 mol, available from Avecia Custom Organophosphorus Molecules, Wilmington, Del.), 4-t-butyl phenol (6.6 grams, 0.044 mol), toluene (34.6 grams, 40.0 milliliters), and N,N-dimethylacetamide (374.8 grams, 400.0 milliliters) are added to a 3-necked 1 liter Morton flask equipped with a Claisen adapter, nitrogen bubbler, submersible thermometer, and 25 milliliter Dean-Stark trap topped with a water-jacketed condenser. The reaction mixture is agitated mechanically at 500 rpm using an IKA RW 20 DZM.n overhead stirrer with glass stir rod and TEFLON® blade. The reaction mixture is refluxed for 6 hours under a slow nitrogen purge. Time zero is taken as the time at which drops of distillate are first observed in the Dean-Stark trap. After air-cooling the reaction to room temperature, the reaction mixture is diluted with tetrahydrofuran (259 milliliters) and poured slowly into vigorously stirring methanol (2 liters) to precipitate the resin product. The precipitate is isolated by vacuum filtration through #54 Whatman filter paper, redissolved in dichloromethane, and stirred with CELITE® 521 (50 grams) for 1 hour. The solution is then filtered through #54 Whatman paper to remove the CELITE® and salts. The filtrate is added slowly to vigorously stirring methanol (4 liters) to reprecipitate the resin. The precipitate is isolated by vacuum filtration through #54 Whatman filter paper, followed by vacuum drying to yield the resin. It is believed that $^1$H and $^{19}$F NMR spectrographs will indicate that the resulting polymer has no terminal fluorine groups, and that the presence of a monophenolic endgroup in the appropriate stoichiometry will be confirmed.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A process for preparing a polymer of the formula

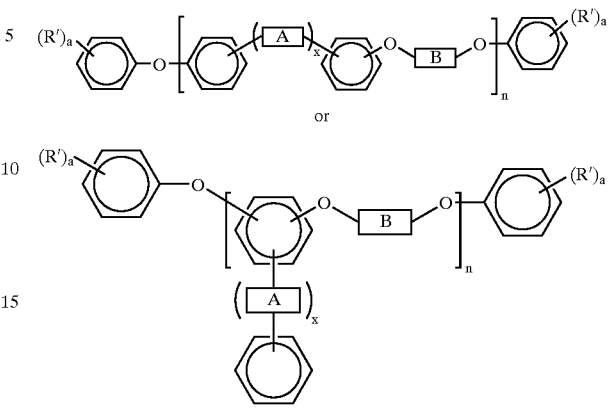

or

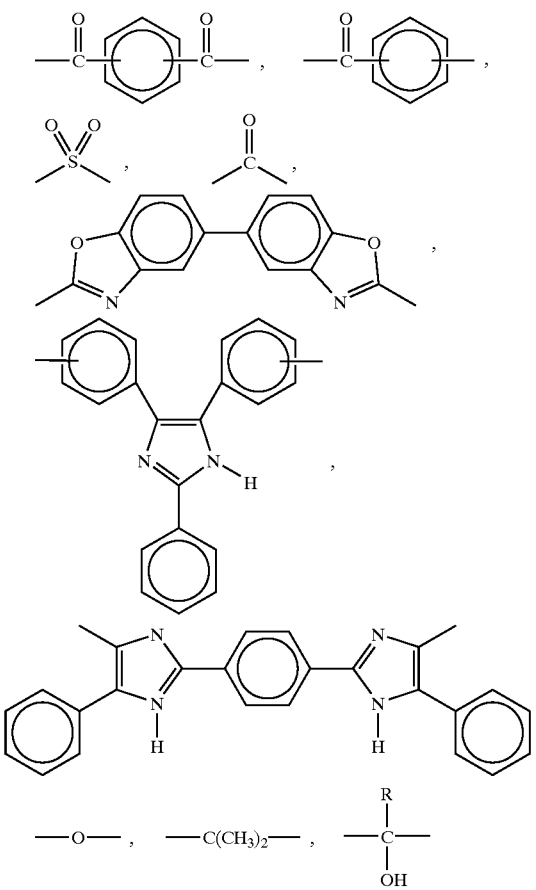

wherein x is an integer of 0 or 1, a is an integer of from 1 to 5, R' is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, or a mixture thereof, A is wherein R is a hydrogen atom, an alkyl group, an aryl group, or mixtures thereof, or mixtures thereof, B is

—(CH₂)ᵥ— wherein v is an integer of from 1 to about 20,

—(CH₂O)ₜ— wherein t is an integer of from 1 to about 20, wherein z is an integer of from 2 to about 20, wherein u is an integer of from 1 to about 20, wherein w is an integer of from 1 to about 20,

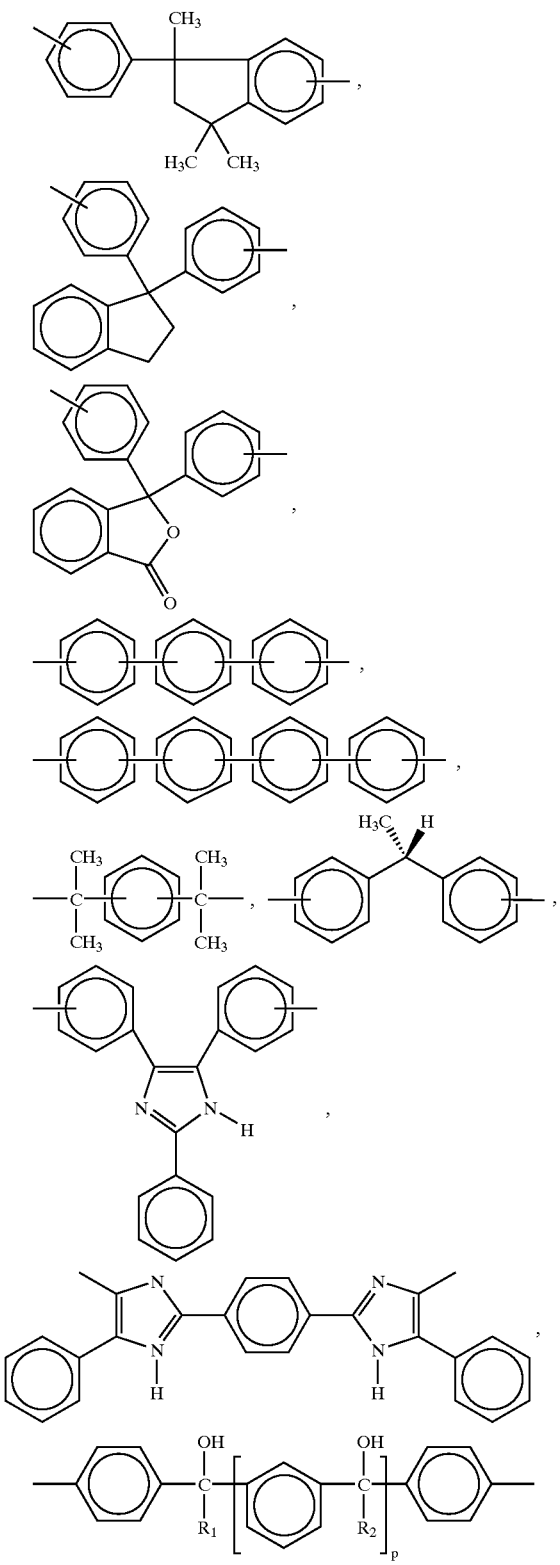

wherein $R_1$ and $R_2$ each, independently of the other, are hydrogen atoms, alkyl groups, aryl groups, or mixtures thereof, and p is an integer of 0 or 1,

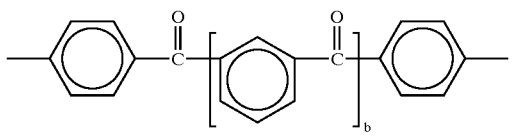

wherein b is an integer of 0 or 1,

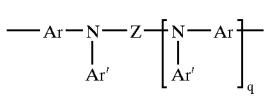

wherein (1) Z is

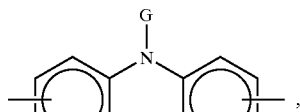

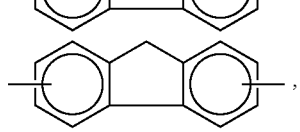

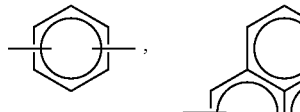

or

—Ar-(X)$_c$-Ar— wherein c is 0 or 1; (2) Ar is

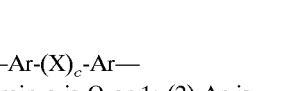

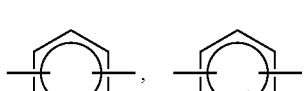

(3) G is an alkyl group selected from alkyl or isoalkyl groups containing from about 2 to about 10 carbon atoms, (4) Ar' is

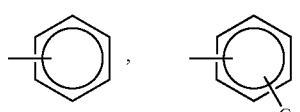

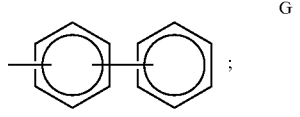

(5) X is

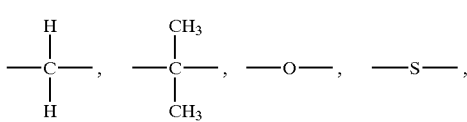

-continued

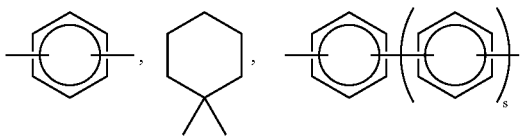

wherein s is 0, 1, or 2,

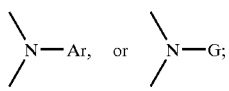

and (6) q is 0 or 1; or mixtures thereof, and n is an integer representing the number of repeating monomer units, said process comprising (A) providing a reaction mixture which comprises (i) a solvent, (ii) a compound of the formula

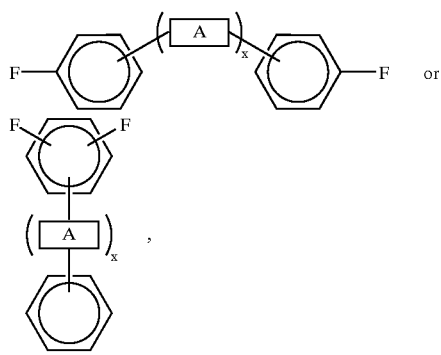

(iii) a compound of the formula

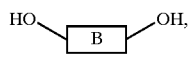

(iv) a compound of the formula

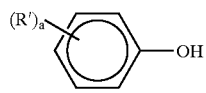

wherein a is an integer of from 1 to 5, R' is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, or a mixture thereof, and (v) a carbonate base, and (B) heating the reaction mixture and removing generated water from the reaction mixture, thereby effecting a polymerization reaction.

2. A process according to claim 1 wherein $R_1$ is a hydrogen atom, an alkyl group with from 1 to about 20 carbon atoms, an aryl group with from 2 to about 14 carbon atoms, an arylalkyl group with from 7 to about 50 carbon atoms, an alkylaryl group with from 7 to about 50 carbon atoms, an alkoxy group with from 1 to about 20 carbon atoms, an aryloxy group with from 6 to about 100 carbon atoms, an arylalkyloxy group with from 7 to about 100 carbon atoms, an alkylaryloxy group with from 7 to about 100 carbon atoms, a polyalkyleneoxy group wherein each repeat alkylene oxide unit, independently of the others in the polyalkyleneoxy group, has from about 2 to about 100 carbon atoms, wherein the polyalkyleneoxy group can contain two or more different kinds of repeat alkylene oxide repeat monomer units, the polyalkyleneoxy group being with from 1 to about 500 repeat alkyleneoxy units, or a mixture thereof.

3. A process according to claim 1 wherein the compound of the formula

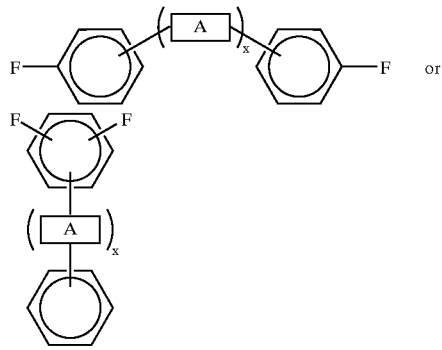

is a difluorobenzophenone.

4. A process according to claim 1 wherein the compound of the formula

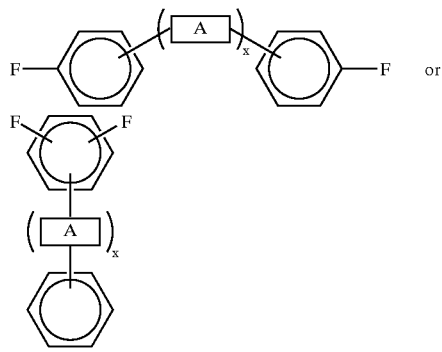

is 4,4'-difluorobenzophenone.

5. A process according to claim 1 wherein the compound of the formula

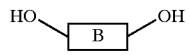

is of the formula

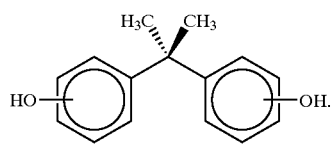

6. A process according to claim 1 wherein the compound of the formula

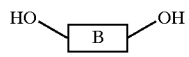

is of the formula

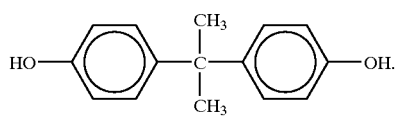

7. A process according to claim 1 wherein the compound of the formula

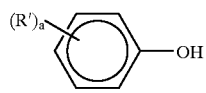

is of the formula

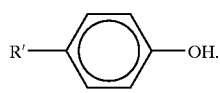

8. A process according to claim 1 wherein R' is t-butyl.

9. A process according to claim 1 wherein the compound of the formula

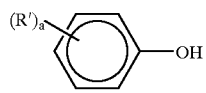

is of the formula

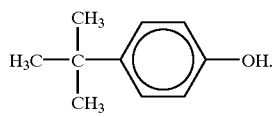

10. A process according to claim 1 wherein the solvent is N,N-dimethylacetamide, sulfolane, dimethyl formamide, dimethyl sulfoxide, N-methylpyrrolidinone, hexamethylphosphoric triamide, or mixtures thereof.

11. A process according to claim 1 wherein the solvent is N,N-dimethylacetamide.

12. A process according to claim 1 wherein the carbonate base is potassium carbonate or cesium carbonate.

13. A process according to claim 1 wherein the carbonate base is present in an amount of at least about 1.05 moles of carbonate base per every one mole of the compound of the formula

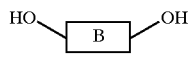

and wherein the carbonate base is present in an amount of no more than about 2 moles of carbonate base per every one mole of the compound of the formula

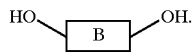

14. A process according to claim 1 wherein the reaction takes place at the reflux temperature of the solvent.

15. A process according to claim 1 wherein the reaction takes place at a temperature of at least about 145° C., and wherein the reaction takes place at a temperature of no more than about 200° C.

16. A process according to claim 1 wherein the polymer thus formed has a weight average molecular weight of at least about 110,000 Daltons, and wherein the polymer thus formed has a weight average molecular weight of no more than about 20,000 Daltons.

17. A process according to claim 1 wherein the polymer thus formed has a polydispersity of no more than about 2.7.

18. A process according to claim 1 wherein the ratio of material of the formula

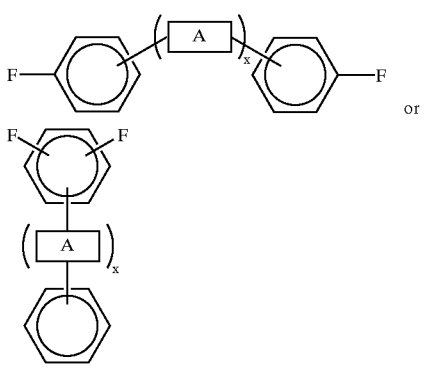

or to material of the formula

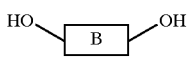

is at least about 1.02 moles of material of the formula

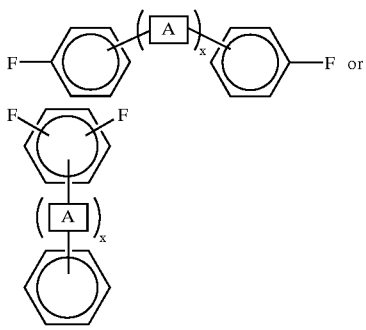

F or per one mole of material of the formula

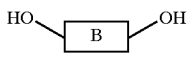

and wherein the ratio of material of the formula

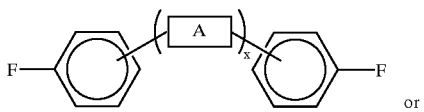

or

-continued

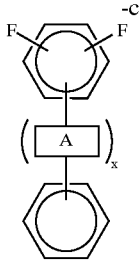

to material of the formula

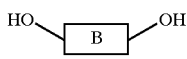

is no more than about 1.15 moles of material of the formula

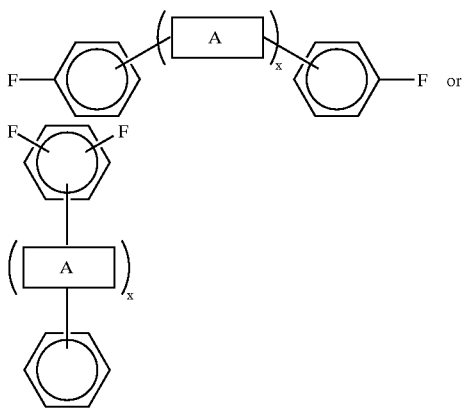

per one mole of material of the formula

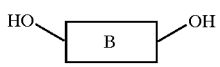

19. A process according to claim 1 wherein the ratio of material of the formula

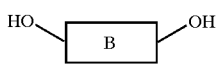

to material of the formula

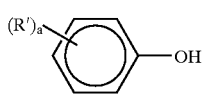

is at least about 2 moles of material of the formula

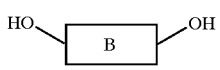

per one mole of material of the formula

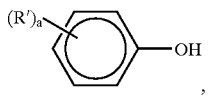

, and wherein the ratio of material of the formula

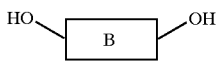

to material of the formula

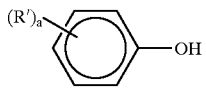

is no more than about 110 moles of material of the formula

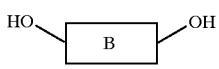

per one mole of material of the formula

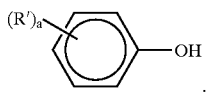

.

20. A process according to claim 1 wherein the ratio of material of the formula

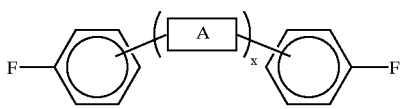

to material of the formula

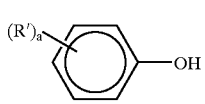

is at least about 2 moles of material of the formula

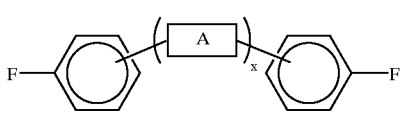

per one mole of material of the formula

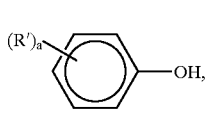

, and wherein the ratio of material of the formula

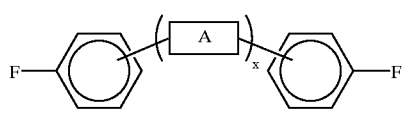

to material of the formula

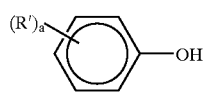

is no more than about 10 moles of material of the formula

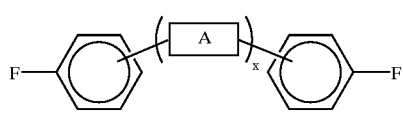

per one mole of material of the formula

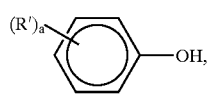

21. A process for preparing a polymer of the formula

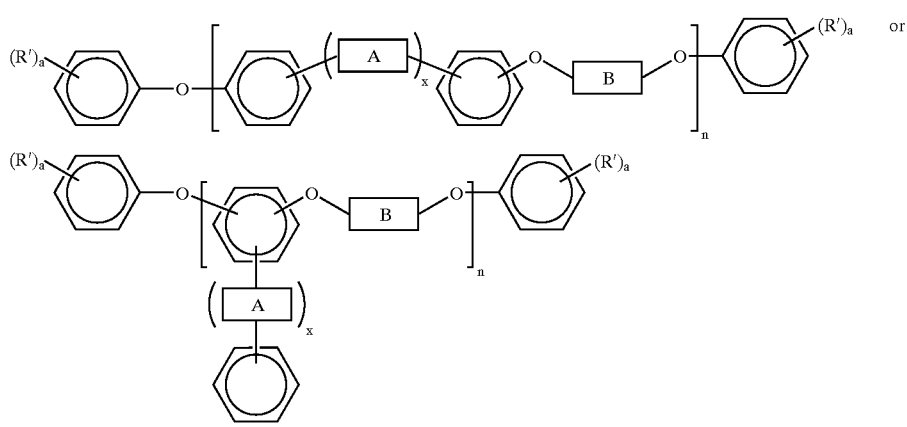

wherein x is an integer of 0 or 1, a is an integer of from 1 to 5, R' is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, or a mixture thereof, A is

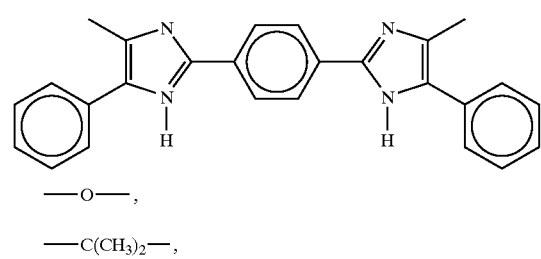

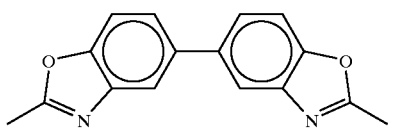

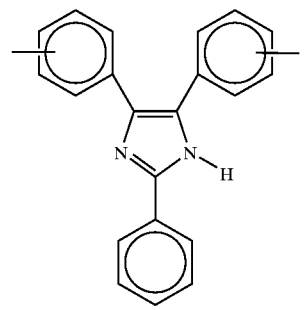

—O—,

—C(CH₃)₂—,

-continued

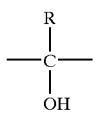

wherein R is a hydrogen atom, an alkyl group, an aryl group, or mixtures thereof,

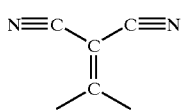

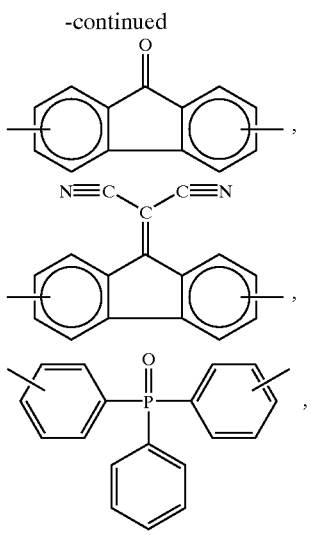
or mixtures thereof, B is
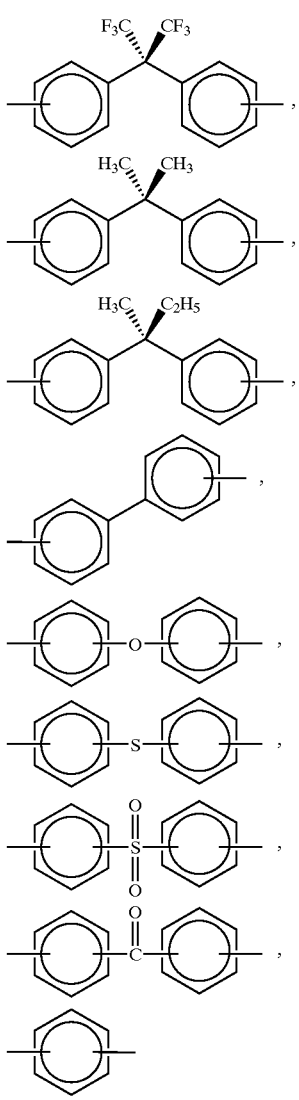
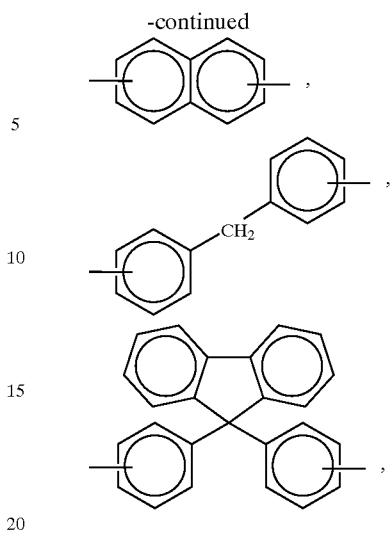
-(CH$_2$)-
wherein v is an integer of from 1 to about 20,
(CH$_2$O)$_t$
wherein t is an integer of from 1 to about 20,
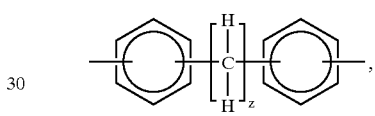
wherein z is an integer of from 2 to about 20,
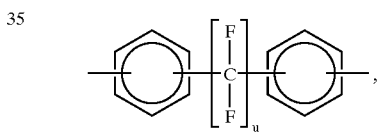
wherein u is an integer of from 1 to about 20,
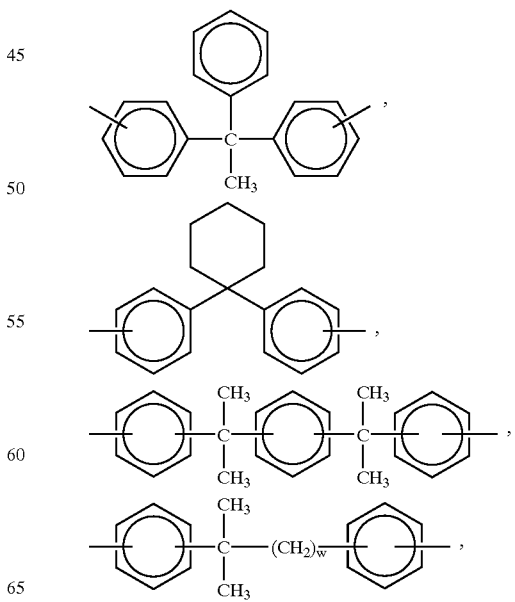

wherein w is an integer of from 1 to about 20,
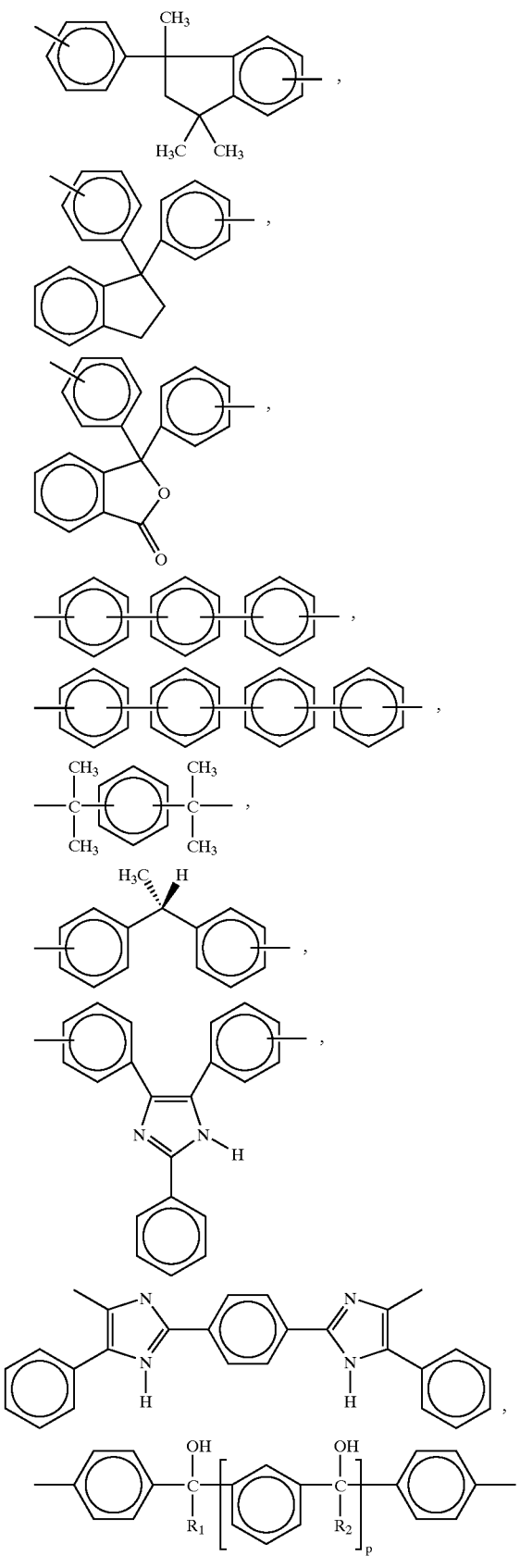
wherein $R_1$ and $R_2$ each, independently of the other, are hydrogen atoms, alkyl groups, aryl groups, or mixtures thereof, and p is an integer of 0 or 1,
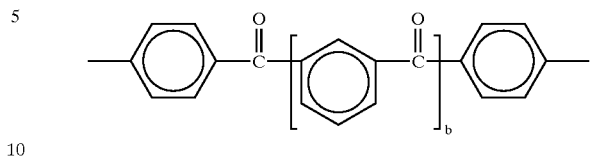
wherein b is an integer of 0 or 1,
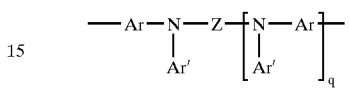
wherein (1) Z is
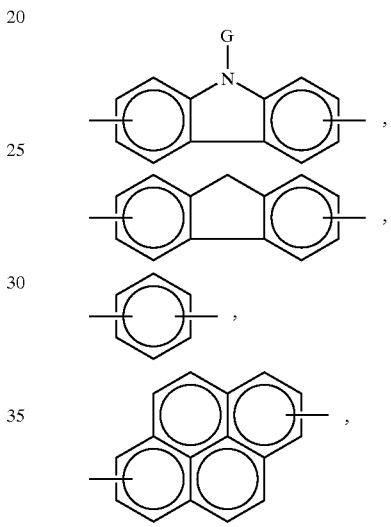
or
—Ar-(X)$_c$-Ar—
wherein c is 0 or 1; (2) Ar is
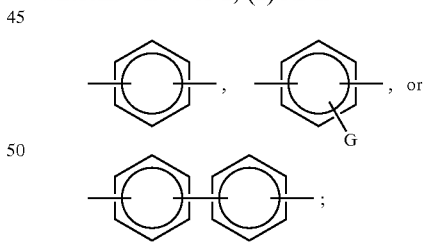
(3) G is an alkyl group selected from alkyl or isoalkyl groups containing from about 2 to about 10 carbon atoms; (4) Ar' is
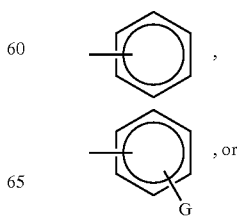

-continued

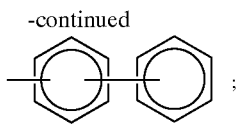

(5) X is

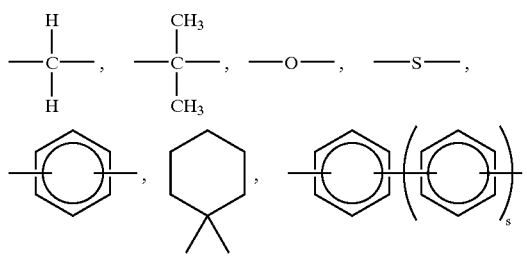

wherein s is 0, 1, or 2,

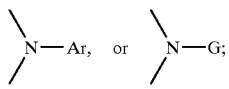

and (6) q is 0 or 1; or mixtures thereof, and n is an integer representing the number of repeating monomer units, said process comprising (A) providing a reaction mixture which comprises (i) a solvent, (ii) a compound of the formula

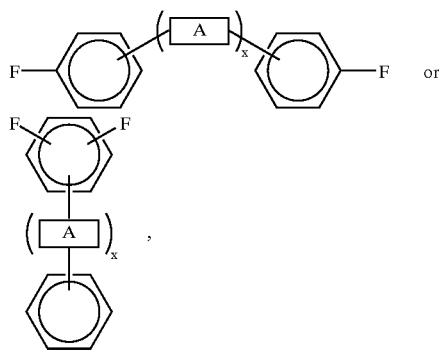

(iii) a compound of the formula

(iv) a compound of the formula

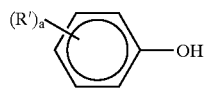

wherein a is an integer of from 1 to 5, R' is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, or a mixture thereof, and (v) a carbonate base; and (B) heating the reaction mixture and removing generated water from the reaction mixture, thereby effecting a polymerization reaction; wherein the carbonate base is present in an amount of from about 1.05 to about 2 moles of carbonate base per every one mole of the compound of the formula

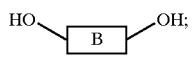

wherein the ratio of material of the formula

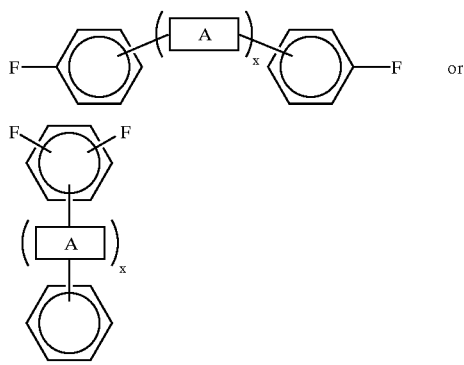

to material of the formula

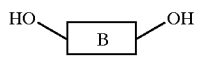

is from about 1.02 to about 1.15 moles of material of the formula

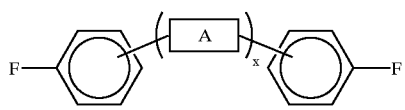

per one mole of material of the formula

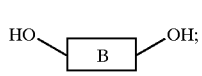

wherein the ratio of material of the formula

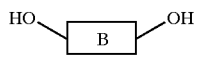

to material of the formula
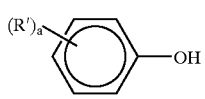
is from about 2 to about 10 moles of material of the formula
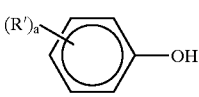
per one mole of material of the formula
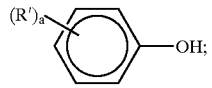
and wherein the ratio of material of the formula
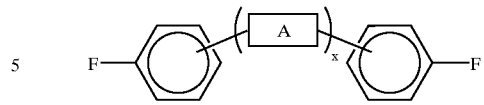
to material of the formula
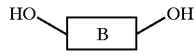
is from about 2 to about 10 moles of material of the formula
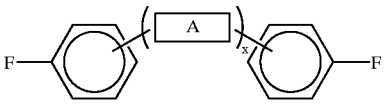
per one mole of material of the formula
22. A process for preparing a polymer of the formula
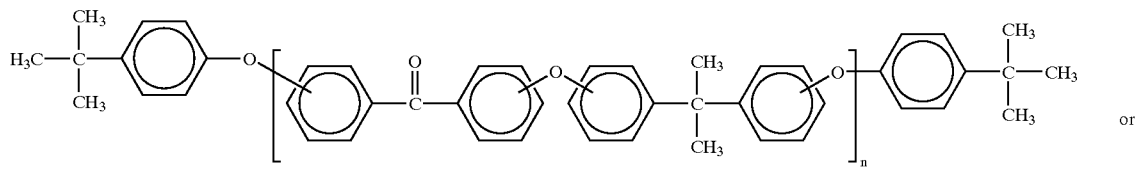 or
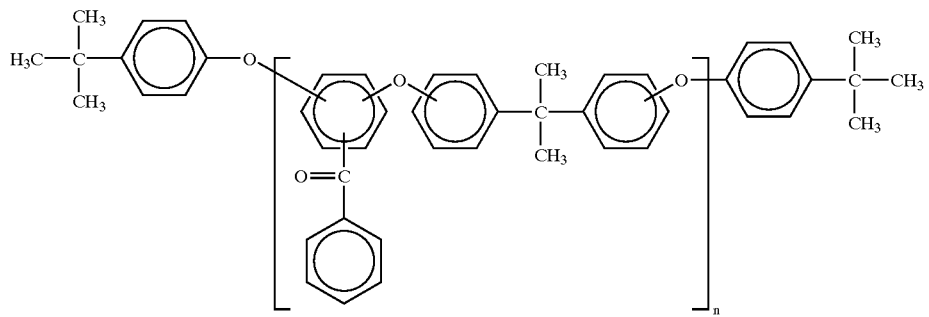

said process comprising (A) providing a reaction mixture which comprises (i) a N,N-dimethylacetamide solvent, (ii) a compound of the formula

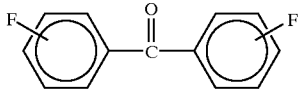 or 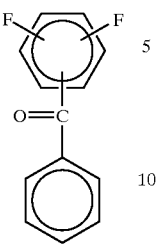

(iii) a compound of the formula

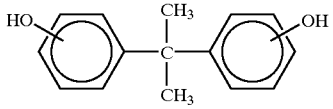

(iv) a compound of the formula

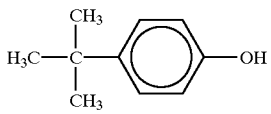

and (v) a carbonate base which is potassium carbonate or cerium carbonate, and (B) heating the reaction mixture to reflux and removing generated water from the reaction mixture, thereby effecting a polymerization reaction.

* * * * *